US012763600B2

(12) United States Patent
Cao et al.

(10) Patent No.: US 12,763,600 B2
(45) Date of Patent: Oct. 13, 2026

(54) MULTIPLE INPUT CONVERTER AND AN UNINTERRUPTIBLE POWER SUPPLY INCLUDING THE SAME

(71) Applicant: SANTAK ELECTRONIC (SHENZHEN) CO., LTD., Shenzhen (CN)

(72) Inventors: Lei Cao, Shenzhen (CN); Dan Liu, Shenzhen (CN); Dawei Zheng, Shenzhen (CN)

(73) Assignee: SANTAK ELECTRONIC (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 19/298,273

(22) Filed: Aug. 13, 2025

(65) Prior Publication Data

US 2025/0373067 A1 Dec. 4, 2025

Related U.S. Application Data

(63) Continuation of application No. 18/581,066, filed on Feb. 19, 2024, now Pat. No. 12,418,194.

(30) Foreign Application Priority Data

Feb. 22, 2023 (CN) ........................ 202310204226.2

(51) Int. Cl.
*H02J 9/06* (2006.01)
*H02M 1/38* (2007.01)
(Continued)

(52) U.S. Cl.
CPC ............... *H02J 9/061* (2013.01); *H02M 1/38* (2013.01); *H02M 3/33584* (2013.01); *H02M 7/219* (2013.01)

(58) Field of Classification Search
CPC ........ H02J 9/061; H02J 9/062; H02J 2207/20; H02J 9/06; H02J 7/56; H02J 7/855;
(Continued)

(56) References Cited

U.S. PATENT DOCUMENTS

2015/0054343 A1* 2/2015 Cui .......................... H02J 3/10
307/66

FOREIGN PATENT DOCUMENTS

CN 105529815 A 4/2016
EP 2846436 A1 3/2015
(Continued)

*Primary Examiner* — Rexford N Barnie
*Assistant Examiner* — Xuan Ly
(74) *Attorney, Agent, or Firm* — Stanek Lemon Crouse & Meeks, PA

(57) ABSTRACT

A multiple input converter for outputting power from AC power or a battery to positive and negative direct current (DC) buses is provided. The multiple input converter includes at least one bridge arm unit and a bidirectional DC-DC conversion unit. The bridge arm unit corresponds to one phase of the alternating current (AC) power and includes an upper and lower bridge arms that can independently form a two-level converter. In a battery mode, the upper and lower bridge arms discharge power from the rechargeable battery to the positive and negative DC buses, and the bidirectional DC-DC conversion unit discharges power from the rechargeable battery to the positive and negative DC buses or balances voltages of the positive and negative DC buses. In a mains mode, the bridge arm units are connected to the AC power. The bidirectional DC-DC conversion unit determine whether to charge or discharge according to load conditions.

18 Claims, 8 Drawing Sheets

(51) Int. Cl.
*H02M 3/335* (2006.01)
*H02M 7/219* (2006.01)

(58) Field of Classification Search
CPC ...... H02J 7/865; H02M 1/38; H02M 3/33584; H02M 7/219; H02M 1/10; H02M 1/088; H02M 7/23; H02M 3/335
USPC ............................................................ 307/66
See application file for complete search history.

(56) References Cited

FOREIGN PATENT DOCUMENTS

| | | | |
|---|---|---|---|
| EP | 2899836 | A1 | 7/2015 |
| EP | 4106142 | A1 | 12/2022 |

* cited by examiner

MULTIPLE INPUT CONVERTER AND AN UNINTERRUPTIBLE POWER SUPPLY INCLUDING THE SAME

STATEMENT OF PRIORITY

The present application is a continuation of U.S. application Ser. No. 18/581,066, filed on Feb. 19, 2024, which claims priority to Chinese Application No. 202310204226.2, filed on Feb. 22, 2023, the entire contents of which are hereby incorporated herein by reference in their entireties.

TECHNICAL FIELD

The present invention relates to the field of power management, and relates in particular to a multiple input converter and an uninterruptible power supply including the same.

BACKGROUND

An online uninterruptible power supply is an uninterruptible power supply device widely used in the industrial field. It mainly consists of components such as a rectifier, an inverter, a circuit breaker, and a battery pack. When the mains voltage is normal, the uninterruptible power supply is in an online mode, and the mains supplies power to a load. When the mains voltage is abnormal or there is a power outage, the uninterruptible power supply is in a battery mode, and the inverter is controlled to operate to convert DC power provided by a rechargeable battery pack into AC power and supply the AC power to the load.

However, a circuit portion for the online mode and a circuit portion for the battery mode usually need to be separately designed for uninterruptible power supplies in the prior art. In addition, the uninterruptible power supply also needs to include a circuit portion for charging a battery. This relatively complex circuit combination requires many elements, resulting in high costs. Moreover, the load capacity of uninterruptible power supplies in the prior art is low. Furthermore, the two circuit portions are separately arranged, causing the overall size of the uninterruptible power supply to be large, which is disadvantageous for miniaturization. Therefore, there is a need for an uninterruptible power supply having a higher load capacity, fewer elements, and a smaller size.

SUMMARY

In view of the above technical problems existing in the prior art, a first aspect of the present invention provides a multiple input converter, comprising at least one bridge arm unit and a bidirectional DC-DC conversion unit, wherein an output end of the multiple input converter further comprises positive and negative DC buses and a neutral point, and the multiple input converter is used to obtain power from AC power or a rechargeable battery and output DC power to the positive and negative DC buses, wherein each of the at least one bridge arm unit corresponds to one phase of the AC power, the bridge arm unit comprises an upper bridge arm and a lower bridge arm that can independently form a two-level converter and have the same structure, an AC switch group, and a first DC switch group, and the upper and lower bridge arms have respective first inductors, wherein output ends of the upper and lower bridge arms are connected in parallel to the positive and negative DC buses, and input ends of the upper and lower bridge arms are configured to be connected to positive and negative electrodes of the rechargeable battery by means of the first DC switch group or to be simultaneously connected to the AC power by means of the AC switch group, and the bidirectional DC-DC conversion unit has a second DC switch group;

wherein in a battery mode, the upper and lower bridge arms are configured to be connected to the positive and negative electrodes of the rechargeable battery by means of the first DC switch group, respectively, so as to convert and output a voltage at two ends of the rechargeable battery to the positive and negative DC buses; and the bidirectional DC-DC conversion unit is configured, by means of the second DC switch group, to discharge power from the rechargeable battery to the positive and negative DC buses when in electrical communication with the rechargeable battery, and to perform a bus voltage balancing process when electrically isolated from the rechargeable battery, the bus voltage balancing process alternately placing the positive and negative DC buses in communication with the neutral point to balance voltages of the positive and negative DC buses; and wherein in a mains mode, the upper and lower bridge arms are configured to be simultaneously connected to the AC power to rectify and output the power to the positive and negative DC buses, and the bidirectional DC-DC conversion unit is connected between the rechargeable battery and the positive and negative DC buses by means of the second DC switch group to perform a charging or discharging process according to load conditions.

Preferably, each of the upper and lower bridge arms of each bridge arm unit of the multiple input converter has a bridge arm midpoint, the first inductor is connected between the bridge arm midpoint and the phase of the AC power, each of the upper and lower bridge arms of each bridge arm unit is a two-level converter, and each two-level converter comprises first and second switch transistors each having an anti-parallel diode;

wherein a first end of each first switch transistor is connected to the positive DC bus, a node formed by connecting a second end of the first switch transistor and a first end of the second switch transistor is the bridge arm midpoint of the bridge arm, and a second end of each second switch transistor is connected to the negative DC bus, and wherein a current flows from the first end to the second end in a body of each of the first and second switch transistors.

Preferably, in the battery mode, the bridge arm unit is configured so that:

the first switch transistor of the upper bridge arm and the second switch transistor of the lower bridge arm remain cut-off; and within a first period, the second switch transistor of the upper bridge arm and the first switch transistor of the lower bridge arm are turned on so that the respective first inductors of the upper and lower bridge arms store energy, and within a second period, the second switch transistor of the upper bridge arm and the first switch transistor of the lower bridge arm are cut off, so that the respective first inductors of the upper and lower bridge arms and the rechargeable battery jointly boost the voltage of the positive and negative DC buses and supply energy thereto.

Preferably, each two-level converter in the upper and lower bridge arms of each bridge arm unit of the multiple input converter forms a three-level converter by means of midpoint clamping.

Preferably, the first end of each first switch transistor is connected to the positive DC bus, a node formed by connecting the second end of the first switch transistor and the first end of the second switch transistor is a bridge arm midpoint of the bridge arm, a second end of the second switch transistor is connected to the negative DC bus, and the three-level converter further comprises third and fourth switch transistors each having an anti-parallel diode, wherein the respective first ends of the third and fourth switch transistors are connected to form a controllable path, and the controllable path is connected between the bridge arm midpoint and the neutral point to form the midpoint clamping, wherein the second end of the third switch transistor of the multiple input converter is connected to the bridge arm midpoint, and the second end of the fourth switch transistor is connected to the neutral point;

wherein in the battery mode, the upper and lower bridge arms of each of the bridge arm units is configured to be connected to positive and negative electrodes of the rechargeable battery, respectively, wherein the bridge arm unit is configured so that:

the first switch transistor of the upper bridge arm and the second switch transistor of the lower bridge arm always remain cut-off; and within a first period, the fourth switch transistor of the upper bridge arm and the third switch transistor of the lower bridge arm are turned on so that the respective first inductors of the upper and lower bridge arms store energy, and within a second period, the fourth switch transistor of the upper bridge arm and the third switch transistor of the lower bridge arm are cut off, so that the respective first inductors of the upper and lower bridge arms and the rechargeable battery jointly boost the voltage of the positive and negative DC buses and supply energy thereto.

Preferably, each three-level converter further comprises first to fourth secondary tubes, wherein a first end of the first switch transistor is connected to an anode of the first diode, a cathode of the first diode is connected to the positive DC bus, a node formed by connecting the first end of the first switch transistor and the anode of the first diode is connected to a cathode of the second diode, and an anode of the second diode is connected to the neutral point; and the second end of the second switch transistor is connected to a cathode of the fourth diode, an anode of the fourth diode is connected to the negative DC bus, a node formed by connecting the second end of the second switch transistor and the cathode of the fourth diode is connected to an anode of the third diode, and a cathode of the third diode is connected to the neutral point; or the first and fourth diodes are replaced with eighth and ninth switch transistors, wherein first ends of the eighth and ninth switch transistors correspond to the cathodes of the first and fourth diodes, and second ends of the eighth and ninth switch transistors correspond to the anodes of the first and fourth diodes.

Preferably, in the battery mode, the bridge arm unit is configured so that:

the first switch transistor of the upper bridge arm and the second switch transistor of the lower bridge arm remain cut-off; and within a first period, the second switch transistor of the upper bridge arm and the first switch transistor of the lower bridge arm are turned on so that the respective first inductors of the upper and lower bridge arms store energy, and within a second period, the second switch transistor of the upper bridge arm and the first switch transistor of the lower bridge arm are cut off, so that the respective first inductors of the upper and lower bridge arms and the rechargeable battery jointly boost the voltage of the positive and negative DC buses and supply energy thereto.

Preferably, the bidirectional DC-DC conversion unit further comprises second and third inductors, and fifth to seventh switch transistors each having an anti-parallel diode, and the second DC switch group comprises a grounding switch group and a battery connection switch group, wherein a first end of the second inductor is connected to a second end of the fifth switch transistor, a first end of the fifth switch transistor is connected to the positive DC bus, a first end of the third inductor is connected to a first end of the seventh switch transistor, and a second end of the seventh switch transistor is connected to the negative DC bus, a first end of the sixth switch transistor is connected to a node formed by connecting the second inductor and the second end of the fifth switch transistor, and a second end of the sixth switch transistor is connected to a node formed by connecting the third inductor and the first end of the seventh switch transistor; and in the battery mode, when voltage amplitudes of the positive and negative DC buses relative to the neutral point are unbalanced, the bidirectional DC-DC conversion unit is configured so that:

by means of turning on the grounding switch group and turning off the battery connection switch group, second ends of the second and third inductors are connected to the neutral point and disconnected from the rechargeable battery, and the fifth switch transistor and the seventh switch transistor are alternately turned on, and the sixth switch transistor remains turned on, so that electric energy of the one among the positive and negative DC buses having a higher voltage amplitude relative to the neutral point is stored in the second and third inductors and finally transferred to the one among the positive and negative DC buses having a lower voltage amplitude relative to the neutral point, so as to achieve balancing of the voltage amplitudes.

Preferably, the multiple input converter further comprises a detection unit for detecting load power, and the multiple input converter is configured to:

when the at least one bridge arm unit operates normally to supply power to the positive and negative DC buses, and the detection unit detects that the load power exceeds a heavy load threshold, control the bidirectional DC-DC conversion unit to convert a voltage of the rechargeable battery and supply power to the positive and negative DC buses; and/or when the detection unit detects that the power of an output end load of the multiple input converter is lower than a light load threshold, supply power to the output end load by only one of the upper bridge arm and the lower bridge arm of the bridge arm unit.

Preferably, N bridge arm units of the multiple input converter are provided, and when the detection unit detects that the mains is restored, the N bridge arm units are configured to switch from the battery mode to the mains mode in sequence at predetermined time intervals, the multiple input converter is configured so that the bidirectional DC-DC conversion unit first switches from the bus voltage balancing process to the discharging process, and then the N bridge arm units switch from the battery mode to the mains mode in sequence at predetermined time intervals, wherein the discharging process continues to supply the power of the rechargeable battery to the positive and negative DC buses through DC-DC conversion.

Preferably, preferably, when three bridge arm units are provided, and correspond to three phases of an AC power input, respectively, the three bridge arm units are configured to perform pulse width modulation of a carrier wave and output, at 120° out of phase with each other, voltages to the positive and negative DC buses. When two bridge arm units are provided, and correspond to two phases of the AC power input, respectively, the two bridge arm units are configured to perform pulse width modulation of a carrier wave and output, at 180° out of phase with each other, voltages to the positive and negative DC buses.

Preferably, the switch transistors of the multiple input converter are insulated-gate bipolar transistors or metal oxide semiconductor field-effect transistors.

A second aspect of the present invention provides an online uninterruptible power supply, comprising:

- the multiple input converter according to any one item of the first aspect of the present invention; and
- a rechargeable battery, a positive electrode and a negative electrode of which are selectively connected to the respective first inductors of the upper and lower bridge arms, respectively, via the first DC switch group.

The power converter according to the present invention multiplexes the bridge arm circuits used for AC power input and battery power output, thereby reducing the number of power elements required in the circuits as much as possible, and has simple circuits, high power density, and low switching loss while improving the potential imbalance between the positive and negative DC buses. The power converter not only reduces costs and facilitates device miniaturization, but also broadens power output ranges for a variety of load conditions.

BRIEF DESCRIPTION OF THE DRAWINGS

Embodiments of the present invention are further described below with reference to the accompanying drawings.

DETAILED DESCRIPTION OF THE EMBODIMENTS

In order to make the objectives, technical solutions and advantages of the present invention clearer, the present invention is further described in detail below through specific embodiments with reference to the accompanying drawings.

A multiple input converter provided according to various embodiments of the present invention described below generally includes at least one bridge arm unit, a bidirectional DC-DC conversion unit, and positive and negative DC buses of which midpoints are clamped to a neutral point. By means of the bridge arm unit, the multiple input converter can perform voltage conversion and rectification of AC power and output DC power to the positive and negative DC buses. Therefore, the number of bridge arm units of the multiple input converter is same as the number of phases of the mains connected. For example, two-phase AC power corresponds to two bridge arm units, and three-phase AC power corresponds to three bridge arm units. In some embodiments of the present invention, in order to simplify the description, a multiple input converter having a single bridge arm unit corresponding to single-phase AC power will be described. However, the embodiments can be expanded to two-phase, three-phase, or more-than-three-phase AC power to provide a multiple input converter having bridge arm units of the same structure corresponding to the number of phases, which does not depart from the concept of the present invention.

Figure 1:
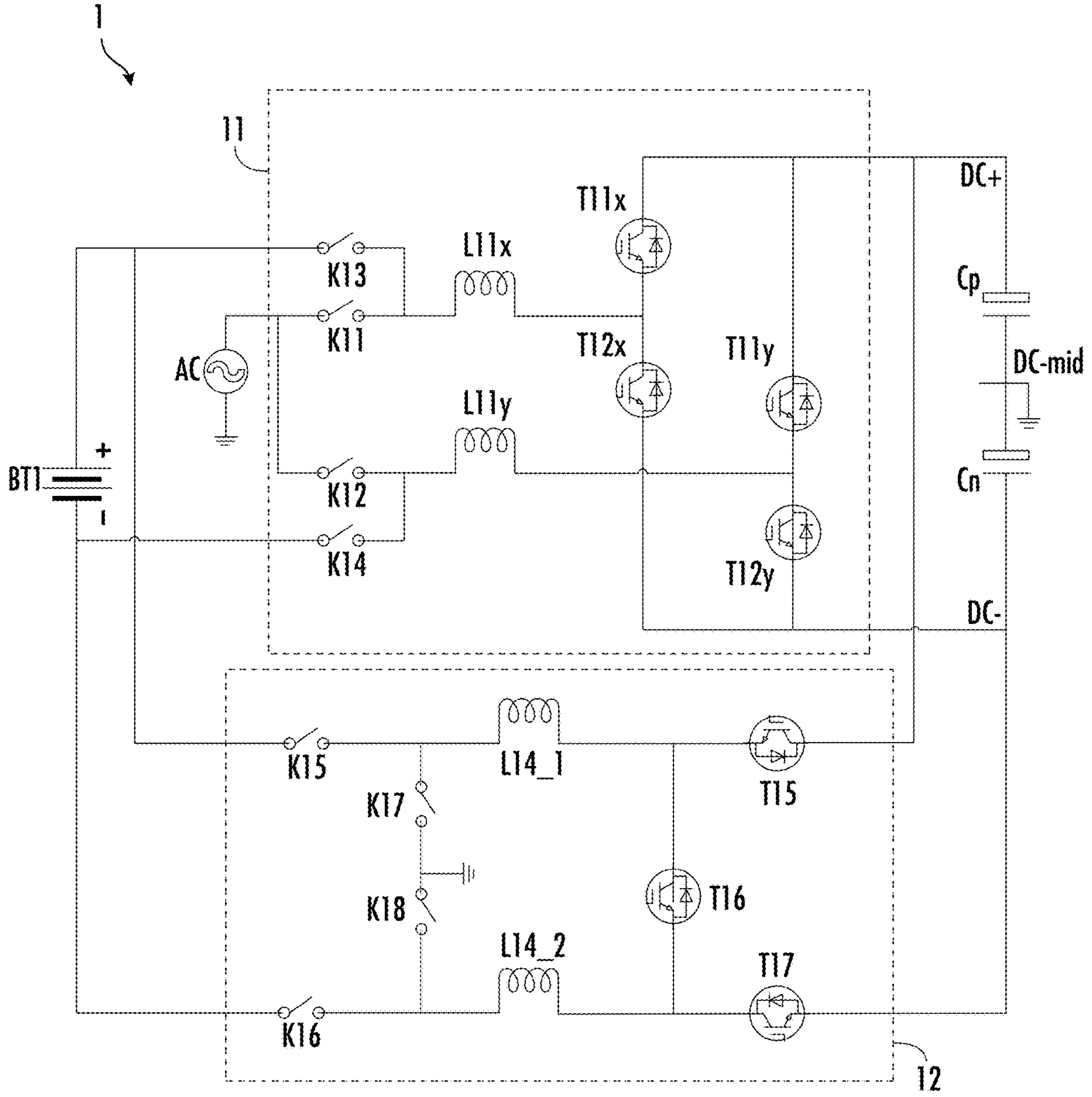
FIG. 1 is a circuit schematic diagram showing a multiple input converter according to a first embodiment of the present invention.

FIG. 1 shows a multiple input converter according to a first embodiment of the present invention. The power converter 1 has a bridge arm unit 11, and a bidirectional DC-DC conversion unit 12, a positive DC bus DC+ and a negative DC bus DC−, wherein a positive bus capacitor Cp and a negative bus capacitor Cn are further connected in series between the positive DC bus DC+ and the negative DC bus DC−, and a bus midpoint formed by connecting the positive bus capacitor Cp and the negative bus capacitor Cn is clamped to a neutral point DC-mid.

The bridge arm unit 11 includes AC switches K11 and K12, DC switches K13 and K14, inductors L11*x* and L11*y*, and switch transistors T11*x*, T12*x*, T11*y*, and T12*y* each having an anti-parallel diode. In the bridge arm unit 11, the inductor L11*x* and the switch transistors T11*x* and T12*x* form an upper bridge arm. The structure of the upper bridge arm is as follows: a first end of the inductor L11*x* is connected to a first end of a single-phase AC power supply by means of the AC switch K11, a second end of the single-phase AC power supply is grounded, and the first end of the inductor L11*x* is further connected to a positive electrode of a battery BT1 by means of the DC switch K13. An emitter of the switch transistor T11*x* is connected to a collector of the switch transistor T12$x$, and a second end of the inductor L11$x$ is connected to a node formed by connecting the switch transistor T11$x$ and the switch transistor T12$x$. The switch transistors T11$x$ and T12$x$ are connected in the same direction in a manner such that the current direction is consistent, so that when the switch transistors are turned on, the flow direction of a current in the switch transistors is from the positive DC bus to the negative DC bus, wherein a collector of the switch transistor T11$x$ is connected to the positive DC bus, and an emitter of the switch transistor T12$x$ is connected to the negative DC bus. In the bridge arm unit 11, the inductor L11$y$ and the switch transistors T11$y$ and T12$y$ form a lower bridge arm, which has the same structure as the upper bridge arm. The structure of the lower bridge arm is as follows: a first end of the inductor L11$y$ is connected to the first end of the single-phase AC power supply by means of the AC switch K12, and the first end of L11$y$ is connected to a negative electrode of the rechargeable battery BT1 by means of the DC switch K14. The switch transistors T11$y$ and T12$y$ are connected in the same direction in a manner such that the current direction is consistent, wherein an emitter of the switch transistor T11$y$ is connected to a collector of the switch transistor T12$y$, a second end of the inductor L11$y$ is connected to a node formed by connecting the switch transistor T11$y$ and the switch transistor T12$y$, a collector of the switch transistor T11$y$ is connected to the positive DC bus DC+, and an emitter of the switch transistor T12$y$ is connected to the negative DC Bus DC−.

The bidirectional DC-DC conversion unit 12 includes switches K15, K16, K17, and K18, inductors L14_1 and L14_2, and switch transistors T15, T16, and T17, wherein a first end of the inductor L14_1 is connected to the positive electrode of the battery BT1 by means of the switch K15, a second end of the inductor L14_1 is connected to an emitter of the switch transistor T15, and a collector of the switch transistor T15 is connected to the positive DC bus DC+. A first end of the inductor L4_2 is connected to the negative electrode of the battery BT1 by means of the switch K16, a second end of the inductor L4_2 is connected to a collector of the switch transistor T17, the emitter of the switch transistor T15 is connected to the negative DC bus DC−, a collector of the switch transistor T16 is connected to a node formed by connecting the second end of the inductor L14_1 and the emitter of switch transistor T15, and an emitter of the switch transistor T16 is connected to a node formed by connecting the second end of the inductor L14_2 and the collector of the switch transistor T17. One end of the switch K17 is connected to a node formed by connecting the first end of the inductor L14_1 and the switch K15, and the other end of the switch K17 is connected to a node formed by connecting the first end of the inductor L14_2 and the switch K16.

The operating modes of the power converter 1 when connected to the mains are as follows:

General Mains Mode

For the bridge arm unit 11, the AC switches K11 and K12 are turned on, and the DC switches K13 and K14 are turned off. Thus, the bridge arm unit 11 is connected between the single-phase AC power supply and the positive and negative DC buses DC+ and DC−. The upper and lower bridge arms of the bridge arm unit 11 are configured to take power from the single-phase AC power supply in a staggered parallel mode (that is, a control module controls the switch transistors T11$x$ and T12$x$ of the upper bridge arm and the switch transistors T11$y$ and T12$y$ of the lower bridge arm to be connected in a staggered parallel manner), and rectify, boost, and output the power to two ends of the positive and negative DC buses DC+ and DC−.

The bidirectional DC-DC conversion unit 12 in the general mains mode may be used to charge the rechargeable battery BT1. When the detection module detects that the voltage of the rechargeable battery BT1 is lower than a first threshold, the control module controls the bidirectional DC-DC conversion unit 12 to reduce the voltage of two ends of the positive and negative DC buses DC+ and DC− and output same to two ends of the rechargeable battery BT1. The switches K15 and K16 are turned on, and the switches K17 and K18 are turned off. The switch transistor T16 is cut off, and the switch transistors T15 and T17 are controlled by the control module to perform switching actions.

Specifically, when charging from the positive DC bus, the switch transistor T15 performs pulse width modulation and the switch transistor T17 is cut off. When the switch transistor T15 is turned on, it is a charging process of the inductor L14_1, having a current direction of: positive DC bus→switch transistor T15→inductor L14_1→positive electrode of the rechargeable battery BT1, and at this time, the inductor L14_1 is charged. When the switch transistor T15 is turned off, it is a freewheeling process of the inductor L14_1, having a current direction of: inductor L14_1→positive electrode of the rechargeable battery BT1→negative electrode of rechargeable the battery BT1→inductor L14_2→body diode of the switch transistor T16→inductor L14_1. When charging from the negative DC bus, the switch transistor T17 performs pulse width modulation and the switch transistor T15 is cut off. When the switch transistor T17 is turned on, it is a charging process of the inductor L14_2, having a current direction of: negative electrode of the rechargeable battery BT1→inductor L14_2→switch transistor T17→negative DC bus, and at this time, the inductor L4_2 is charged. When the switch transistor T17 is turned off, it is a freewheeling process of the inductor L14_2, having a current direction of: inductor L14_2→body diode of the switch transistor T16→inductor L14_1→positive electrode of the rechargeable battery BT1→negative electrode of the rechargeable battery BT1→inductor L14_2.

Mains Light Load Mode

When the detection unit detects that the power of the output end load of the power converter 1 is lower than a second threshold, the control module may control the power converter 1 to operate in the mains light load mode. For the bridge arm unit 11, the AC switches K11 and K12 are turned on, and the DC switches K13 and K14 are turned off. Thus, the bridge arm unit 11 is connected between the single-phase AC power supply and the positive and negative DC buses DC+ and DC−. The control module only controls the switch transistors T11$x$ and T12$x$ of the upper bridge arm to perform a pulse width modulation operation to supply power to the output end load, and the switch transistors T11$y$ and T12$y$ of the lower bridge arm are always cut off. Alternatively, the control module only controls the switch transistors T11$y$ and T12$y$ of the lower bridge arm to perform a pulse width modulation operation to supply power to the output end load, and the switch transistors T11$x$ and T12$x$ of the upper bridge arm are always cut off. Alternatively, the upper and lower bridge arms alternately perform the pulse width modulation operation to supply power to the output end load. Thus, the bridge arm unit 11 is configured so that at the same time, only one of the upper bridge arm and the lower bridge arm supplies power to the output end load and the other bridge arm does not operate, thereby taking power from the single-phase AC power supply, and rectifying, boosting, and outputting the power to two ends of the positive and negative DC buses DC+ and DC−. In addition, the process of charging the rechargeable battery BT1 by the bidirectional DC-DC conversion unit 12 in the mains light load mode is the same as that of charging the rechargeable battery BT1 by the bidirectional DC-DC conversion unit 12 in the general mains mode, and will not be described again here.

Mains Heavy Load Mode

When the detection unit detects that the output end load of the power converter 1 is higher than a third threshold, and the mains is normal and the rechargeable battery has sufficient remaining power, the control module controls the power converter 1 to operate in the mains heavy load mode. The upper and lower bridge arms of the bridge arm unit 11 are configured to perform rectification and voltage boosting in a staggered parallel mode. This process is the same as the staggered parallel mode of the bridge arm unit 11 in the general mains mode, and will not be described again here. Moreover, the bidirectional DC-DC conversion unit 12 is configured to boost the voltage at two ends of the rechargeable battery BT1 and supply power to two ends of the positive and negative DC buses DC+ and DC−, wherein the switch transistors T15 and T17 are controlled to be cut off, and the switch transistor T16 is controlled to perform pulse width modulation to form a boost circuit. The AC power from the mains and the rechargeable battery BT1 jointly supply power to the load, and the third threshold is greater than the second threshold.

Battery Mode

Figure 2:
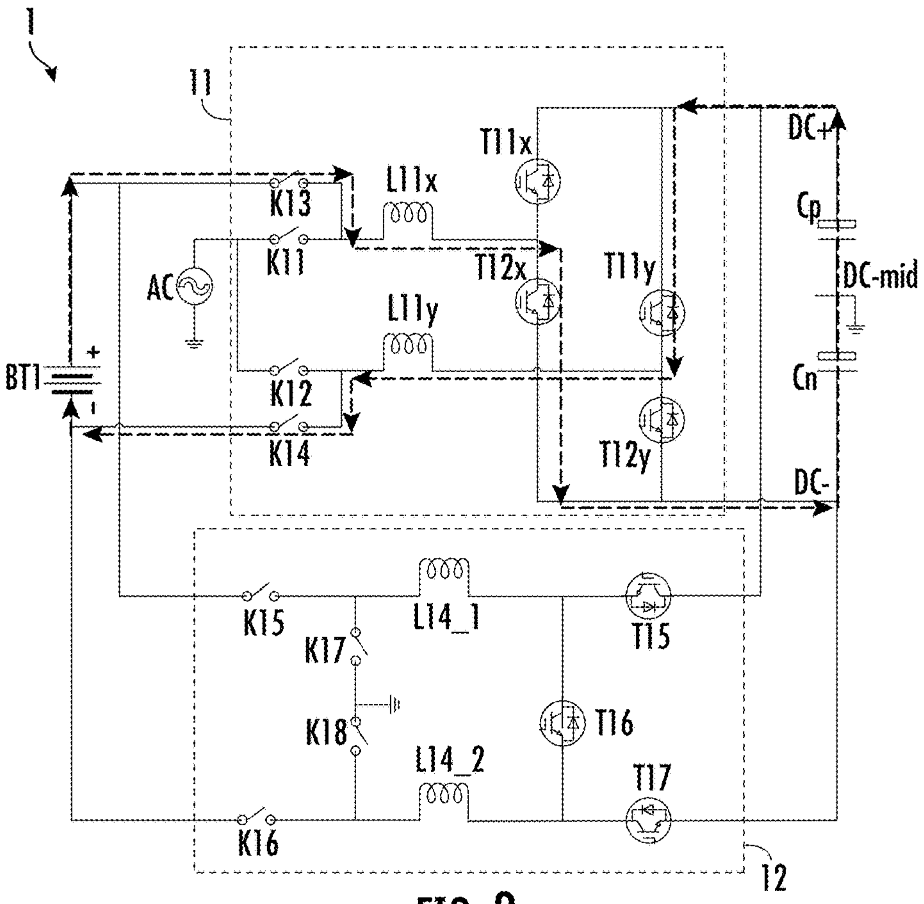
FIGS. 2 and 3 are schematic diagrams showing current directions in which a bridge arm unit of the power converter shown in FIG. 1 is multiplexed as a battery-mounted bridge arm in a battery mode.
Figure 3:
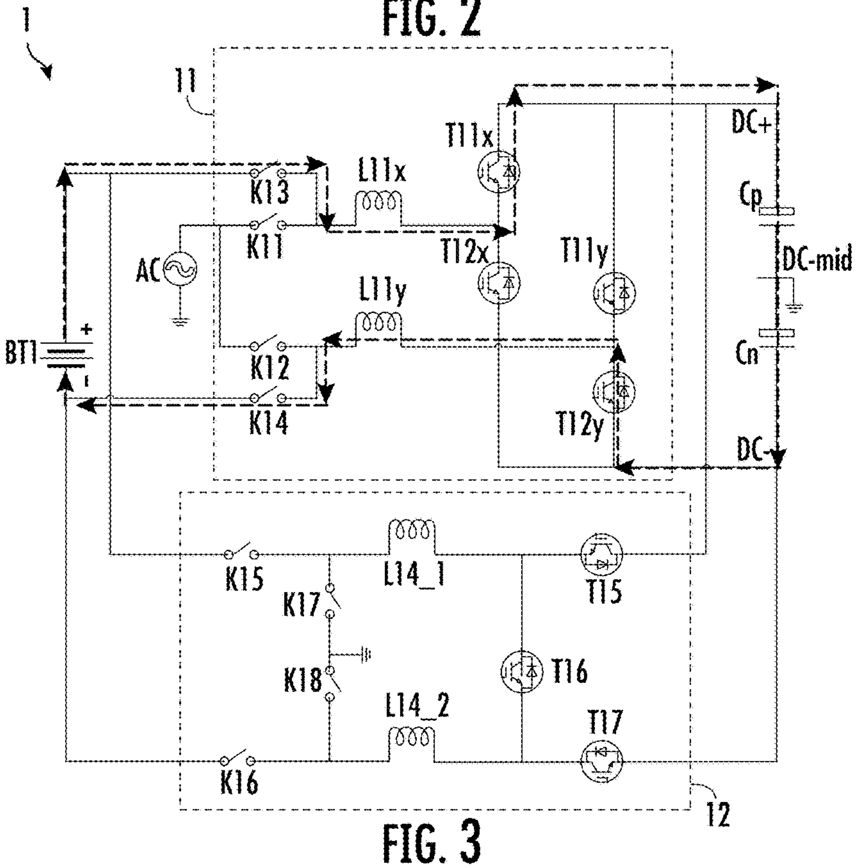

FIGS. 2 and 3 are schematic diagrams showing current directions in which the bridge arm unit 11 of the power converter 1 shown in FIG. 1 is multiplexed as a battery-mounted bridge arm in the battery mode.

In the battery mode, the upper bridge arm of the bridge arm unit 11 is multiplexed as a mounted bridge arm from the positive electrode of the rechargeable battery BT1 to the positive DC bus DC+, and the lower bridge arm of the bridge arm unit 11 is multiplexed as a mounted bridge arm from the negative electrode of the rechargeable battery BT1 to the negative DC bus DC−. Specifically, the AC switches K11 and K12 are turned off, the DC switches K13 and K14 are turned on, and the control module controls the switch transistors T12*x* and T11*y* to perform pulse width modulation and controls the switch transistors T11*x* and T12*y* to cut off. As shown in FIG. 2, when the switch transistors T12*x* and T11*y* are turned on, it is an energy storage process of the inductors L11*x* and L11*y*, having a current direction of: positive electrode of the rechargeable battery BT1→inductor L11*x*→switch transistor T12*x*→negative DC bus DC−→positive DC Bus DC+→switch transistor T11*y*→inductor L11*y*→negative electrode of the rechargeable battery BT1→positive electrode of the rechargeable battery BT1. As shown in FIG. 3, when the switch transistors T12*x* and T11*y* are cut off, it is a release process of energy stored in the inductors L11*x* and L11*y*, having a current direction of: positive electrode of the rechargeable battery BT1→inductor L11*x*→switch transistor T11*x*→positive DC bus DC+→negative DC Bus DC−→body diode of the switch transistor T12*y*→inductor L11*y*→negative electrode of the rechargeable battery BT1→positive electrode of the rechargeable battery BT1. The rechargeable battery BT1 and the inductors L11*x* and L11*y* are connected in series to boost and supply power to the positive and negative DC buses.

Positive and negative bus voltage balancing process in the battery mode: the bidirectional DC-DC conversion unit 12 in the battery mode may be multiplexed as a positive and negative bus voltage balancing bridge arm. In the battery mode, when the detection module detects that the respective voltage amplitudes of the positive and negative DC buses are unbalanced relative to the neutral point DC-mid, the bidirectional DC-DC conversion unit 12 can also be multiplexed as the positive and negative bus voltage balancing bridge arm to equalize the voltages of the positive and negative DC buses. Specifically, when multiplexed as the balancing bridge arm, the switches K17 and K18 of the bidirectional DC-DC conversion unit 12 are turned on, K15 and K16 are turned off, the switch transistor T16 continues to be turned on, and the switch transistors T15 and T17 are alternately turned on in a complementary manner, wherein when a switch transistor (one of the switch transistors T15 and T17) connected to a bus on a side having a higher original voltage value is turned on, the inductor between the bus on this side and the neutral point is charged, and when the switch transistor is cut off and the other switch transistor is turned on in a complementary manner, the charged inductor charges a bus on a side having a lower original voltage value. After the above steps are performed multiple times, the positive and negative bus voltages will gradually tend to be balanced.

Figure 4:
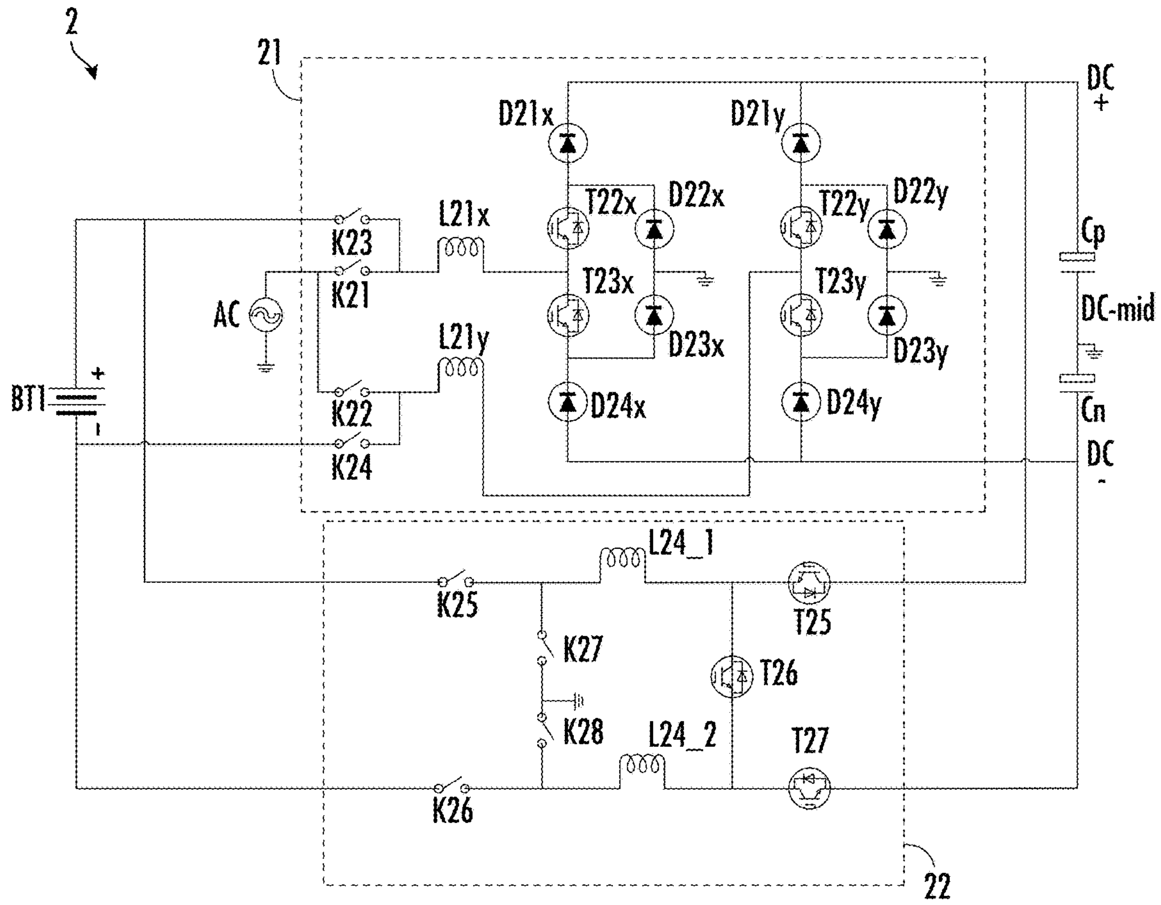
FIG. 4 is a circuit schematic diagram showing a multiple input converter according to a second embodiment of the present invention.

FIG. 4 shows a multiple input converter according to a second embodiment of the present invention. The structure of the multiple input converter 2 shown in FIG. 4 is similar to that of the multiple input converter 1 shown in FIG. 1. For the sake of brief description, only a one-phase AC power input is taken as an example, but a multiple input converter having the number of bridge arm units corresponding to two-phase, three-phase, or even more-than-three-phase AC power in the modifications of the multiple input converter 2 based on the present embodiment is also possible. The multiple input converter 2 shown in FIG. 4 has a bridge arm unit 21, a bidirectional DC-DC conversion unit 22, a positive DC bus DC+, and a negative DC bus DC−, and a bus midpoint formed by connecting a positive bus capacitor Cp and a negative bus capacitor Cn is clamped to a neutral point DC-mid. In addition, the circuit structure of the bidirectional DC-DC conversion unit 22 shown in FIG. 4 is the same as that of the bidirectional DC-DC conversion unit 12 shown in FIG. 1, having only different reference signs. The difference between FIG. 4 and FIG. 1 is that the bridge arm unit 11 shown in FIG. 1 is configured as a two-level bridge arm structure, whereas the bridge arm unit 21 shown in FIG. 4 is configured as an I-type three-level rectification topology by means of midpoint clamping, wherein the bridge arm unit 21 includes AC switches K21 and K22, DC switches K23 and K24, inductors L21*x* and L21*y*, switch transistors T22*x*, T23*x*, T22*y*, and T23*y*, and diodes D21*x*, D22*x*, D23*x*, D24*x*, D21*y*, D22*y*, D23*y*, and D24*y*. In the bridge arm unit 21, the inductor L21*x*, the switch transistors T22*x* and T23*x*, and the diodes D21*x*, D22*x*, D23*x*, and D24*x* form an upper bridge arm, and the inductor L21*y*, the switch transistors T22*y* and T23*y*, and the diodes D21*y*, D22*y*, D23*y*, and D24*y* form a lower bridge arm. The upper bridge arm structure is as follows:

A first end of the inductor L21*x* is connected to a first end of a single-phase AC power supply by means of the AC switch K21, a second end of the single-phase AC power supply is grounded, and the first end of the inductor L21*x* is further connected to a positive electrode of a battery BT1 by means of the DC switch K23. An emitter of the switch transistor T22*x* is connected to a collector of the switch transistor T23*x*, and a node formed by connecting the two is connected to a second end of the inductor L21*x*. A collector of the switch transistor T22*x* is connected to an anode of the diode D21*x*, a cathode of the diode D21*x* is connected to the positive DC bus DC+, an emitter of the switch transistor T23*x* is connected to a cathode of the diode D24*x*, and an anode of the diode D24*x* is connected to the negative DC bus DC−. A node formed by connecting the collector of the switch transistor T22*x* and the anode of the diode D21*x* is connected to a cathode of the diode D22*x*, an anode of the diode D22*x* is connected to the neutral point, a node formed by connecting an emitter of the switch transistor T23*x* and a cathode of the diode D24*x* is connected to an anode of the diode D23*x*, and a cathode of the diode D23*x* is connected to the neutral point. The structure of the lower bridge arm is the same as that of the upper bridge arm and will not be described again here.

The operating modes of the power converter 2 when connected to the mains are as follows:

General Mains Mode

For the bridge arm unit 21, the AC switches K21 and K22 are turned on, and the DC switches K23 and K24 are turned off. Thus, the bridge arm unit 21 is connected between the single-lower bridge arms of the bridge arm unit 21 are configured to alternately take power from the single-phase AC power supply in a staggered parallel mode (that is, a control module controls the switch transistor group (T22*x* and T23*x*) of the upper bridge arm and the switch transistor group (T22*y* and T23*y*) of the lower bridge arm to be connected in a staggered parallel manner), and rectify, boost, and output the power to two ends of the positive and negative DC buses DC+ and DC−.

The bidirectional DC-DC conversion unit 22 in the general mains mode may be used to charge the rechargeable battery BT1. The process thereof is similar the process in Embodiment 1 in which the bidirectional DC-DC conversion unit 12 may be used to charge the rechargeable battery BT1 in the general mains mode, and will not be described again.

Mains Light Load Mode

When the detection unit detects that the output end load of the power converter 2 is lower than a fourth threshold, the control module may control the power converter 2 to operate in the mains light load mode. It is similar to the mains light load mode in Embodiment 1, and will not be described again.

Mains Heavy Load Mode

When the detection unit detects that the output end load of the power converter 2 is higher than a fifth threshold, the control module controls the power converter 2 to operate in the mains heavy load mode. It is similar to the mains heavy load mode in Embodiment 1, and will not be described again.

Battery Mode

Figure 5:
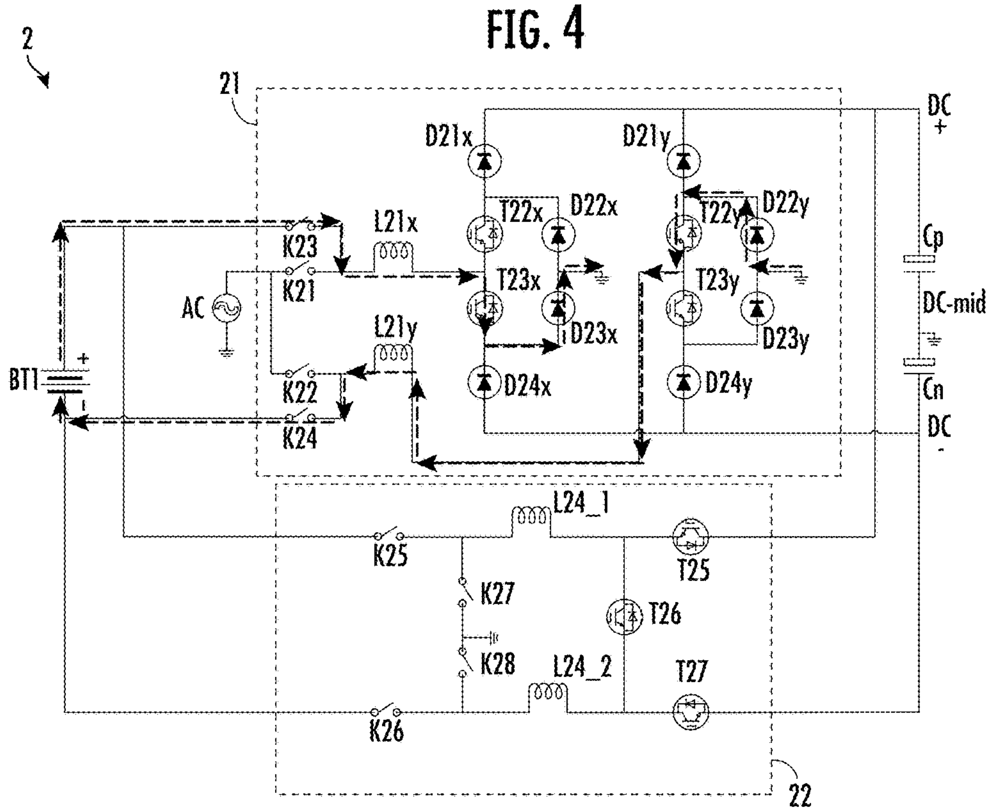
FIGS. 5 and 6 are schematic diagrams showing current directions in which a bridge arm unit of the power converter shown in FIG. 4 is multiplexed as a battery-mounted bridge arm in a battery mode.
Figure 6:
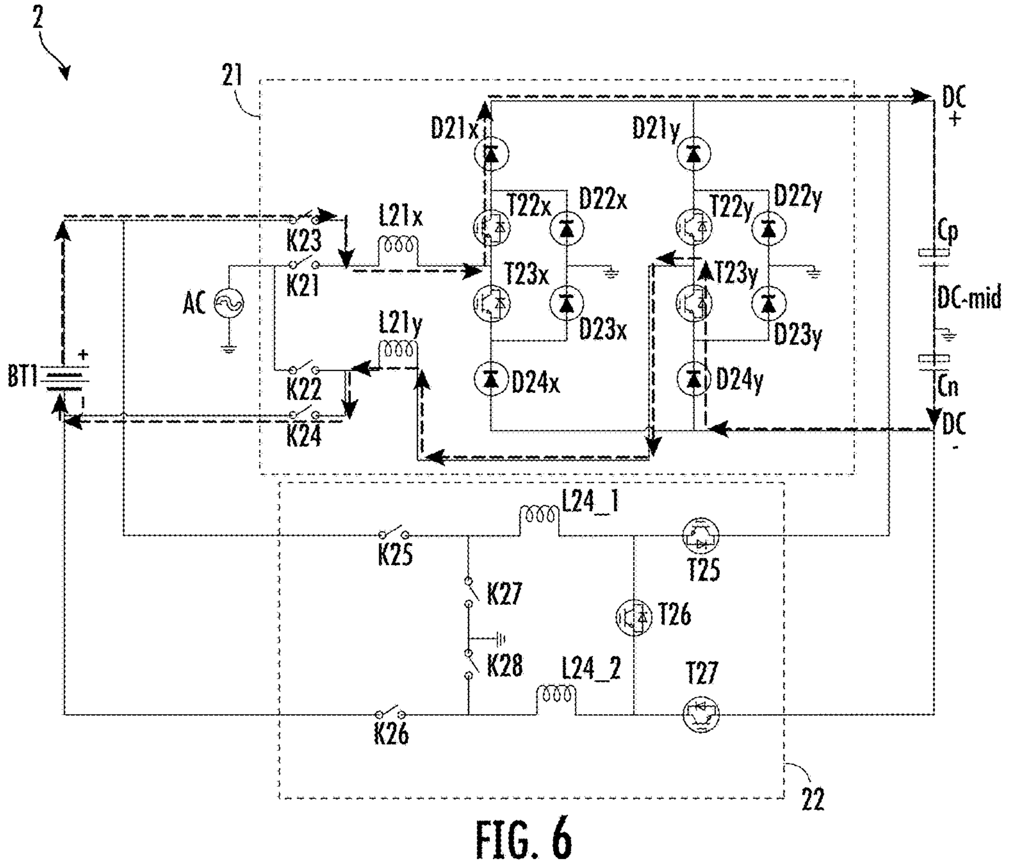

FIGS. 5 and 6 are schematic diagrams showing current directions in which a bridge arm unit of the power converter shown in FIG. 4 is multiplexed as a battery-mounted bridge arm in a battery mode. In the battery mode, the upper bridge arm of the bridge arm unit 21 is multiplexed as a mounted bridge arm from the positive electrode of the rechargeable battery BT1 to the positive DC bus DC+, and the lower bridge arm of the bridge arm unit 21 is multiplexed as a mounted bridge arm from the negative electrode of the rechargeable battery BT1 to the negative DC bus DC−. Specifically, the AC switches K21 and K22 are turned off, the DC switches K23 and K24 are turned on, the control module controls the switch transistors T23*x* and T22*y* to perform pulse width modulation, and the switch transistors T22*x* and T23*y* are controlled to remain cut-off. As shown in FIG. 5, when the switch transistors T23*x* and T22*y* are turned on, it is an energy storage process of the inductors L21*x* and L21*y*, having a current path of: positive electrode of the rechargeable battery BT1→inductor L21*x*→switch transistor T23*x*→diode D23*x*→neutral point→diode D22*y*→switch transistor T22*y*→inductor L21*y*→negative electrode of the rechargeable battery BT1→positive electrode of the rechargeable battery BT1. As shown in FIG. 6, when the switch transistors T23*x* and T22*y* are cut off, it is a release process of energy stored in the inductors L21*x* and L21*y*, having a current direction of: positive electrode of the rechargeable battery BT1→inductor L21*x*→switch transistor T22*x*→diode D21*x*→positive DC bus DC+→negative DC bus DC−→diode D24*y*→body diode of the switch transistor T23*y*→inductor L21*y*→negative electrode of the rechargeable battery BT1→positive electrode of the rechargeable battery BT1.

The bidirectional DC-DC conversion unit 22 in the battery mode may be multiplexed as a positive and negative bus voltage balancing bridge arm. It is similar to the process in Embodiment 1 in which the bidirectional DC-DC conversion unit 12 is multiplexed as the positive and negative bus voltage balancing bridge arm, and will not be described again.

In a further modification of the embodiment shown in FIG. 4, the diode D21*x* in FIG. 4 is replaced with a switch transistor T25 having an anti-parallel diode, and the diode D24*x* is replaced with a switch transistor T26 having an anti-parallel diode. The connection direction of the switch transistor T25 and the switch transistor T26 is the same as the connection direction of the switch transistor T22*x* and the switch transistor T22*x*, the emitters of the switch transistor T25 and the switch transistor T26 correspond to the anodes of the diode D21*x* and the diode D24*x*, and the collectors of the switch transistor T25 and the switch transistor T26 correspond to the cathodes of the diode D21*x* and the diode D24*x*. That is, the collector of the switch transistor T22 *x* is connected to the emitter of the switch transistor T25, the collector of the switch transistor T25 is connected to the positive DC bus, the emitter of the switch transistor T23*x* is connected to the collector of the switch transistor T26, and the emitter of the switch transistor T26 is connected to the negative DC bus.

Figure 7:
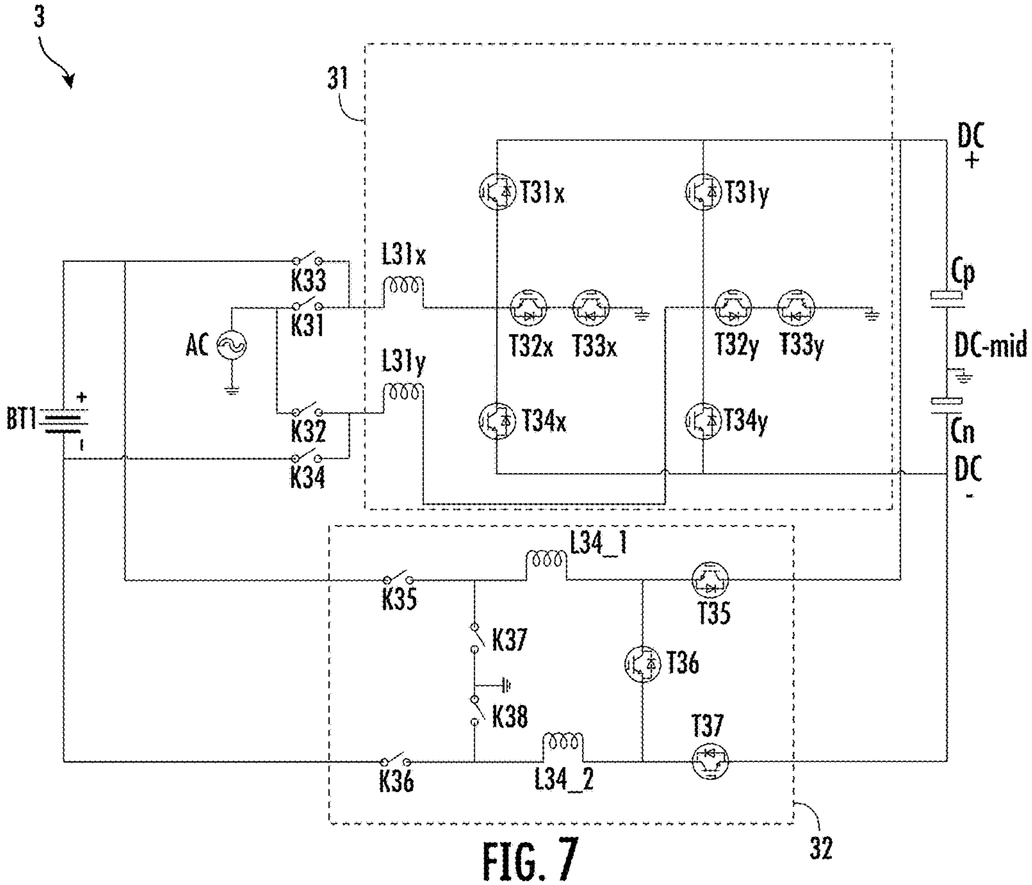
FIG. 7 is a circuit schematic diagram showing a multiple input converter according to a third embodiment of the present invention.

FIG. 7 shows a multiple input converter according to a third embodiment of the present invention. The structure of the multiple input converter 3 shown in FIG. 7 is similar to that of the multiple input converter 2 shown in FIG. 4. For the sake of brief description, only a one-phase AC power input is taken as an example, but a multiple input converter having the number of bridge arm units corresponding to two-phase, three-phase, or even more-than-three-phase AC power in the modifications of the multiple input converter 3 based on the present embodiment is also possible. The multiple input converter 3 shown in FIG. 7 has a bridge arm unit 31, a bidirectional DC-DC conversion unit 32, a positive DC bus DC+, and a negative DC bus DC−, and a bus midpoint formed by connecting a positive bus capacitor Cp and a negative bus capacitor Cn is clamped to a neutral point DC-mid. In addition, the circuit structure of the bidirectional DC-DC conversion unit 32 shown in FIG. 7 is the same as that of the bidirectional DC-DC conversion unit 22 or 12 shown in FIG. 4 or 1, with having different reference signs. The difference between the circuits shown in FIG. 7 and FIG. 4 is that the bridge arm unit 21 shown in FIG. 4 is configured as an I-type three-level rectification topology by means of midpoint clamping, whereas the bridge arm unit 31 shown in FIG. 7 is configured as a T-type three-level rectification topology by means of midpoint clamping, wherein the bridge arm unit 31 includes AC switches K31 and K32, DC switches K33 and K34, inductors L31*x* and L31*y*, and switch transistors T31*x*, T32*x*, T33*x*, T34*x*, T31*y*, T32*y*, T33*y*, and T34*y*. In the bridge arm unit 31, the inductor L31*x* and the switch transistors T31*x*, T32*x*, T33*x*, and T34*x* form an upper bridge arm, and the inductor L31*y* and the switch transistors T31*y*, T32*y*, T33*y*, and T34*y* form a lower bridge arm. The structure of the upper bridge arm is as follows: a first end of the inductor L31*x* is connected to a first end of a single-phase AC power supply by means of the AC switch K31, a second end of the single-phase AC power supply is grounded, and the first end of the inductor L31*x* is further connected to a positive electrode of a battery BT1 by means of the DC switch K33. An emitter of the switch transistor T31*x* is connected to a collector of the switch transistor T34*x*, a node formed by connecting the two is connected to a second end of the inductor L31*x* and an emitter of the switch transistor T32*x*, a collector of the switch transistor T32*x* is connected to a collector of the switch transistor T33*x*, and an emitter of the switch transistor T33*x* is grounded. A collector of the switch transistor T31*x* is connected to the positive DC bus DC+, and an emitter of the switch transistor T34*x* is connected to the negative DC bus DC−. The structure of the lower bridge arm is the same as that of the upper bridge arm, and will not be described again here.

The operating modes of the power converter 3 when connected to the mains are as follows:

General Mains Mode

For the bridge arm unit 31, the AC switches K31 and K32 are turned on, and the DC switches K33 and K34 are turned off. Thus, the bridge arm unit 31 is connected between the single-lower bridge arms of the bridge arm unit 31 are configured to alternately take power from the single-phase AC power supply in a staggered parallel mode (that is, a control module controls the switch transistor group (T31*x*, T32*x*, T33*x*, and T34*x*) of the upper bridge arm and the switch transistor group (T31*y*, T32*y*, T33*y*, and T34*y*) of the lower bridge arm to be connected in a staggered parallel manner), and rectify, boost, and output the power to two ends of the positive and negative DC buses DC+ and DC−.

The bidirectional DC-DC conversion unit 32 in the general mains mode may be used to charge the rechargeable battery BT1. The process thereof is similar to the process in Embodiment 1 in which the bidirectional DC-DC conversion unit 12 may be used to charge the rechargeable battery BT1 in the general mains mode, and will not be described again.

Mains Light Load Mode

When the detection unit detects that the output end load of the power converter 3 is lower than a sixth threshold, the control module may control the power converter 3 to operate in the mains light load mode. It is similar to the mains light load mode in Embodiment 1, and will not be described again.

Mains Heavy Load Mode

When the detection unit detects that the output end load of the power converter 3 is higher than a seventh threshold, the control module controls the power converter 3 to operate in the mains heavy load mode. It is similar to the mains heavy load mode in Embodiment 1, and will not be described again.

Battery Mode

Figure 8:
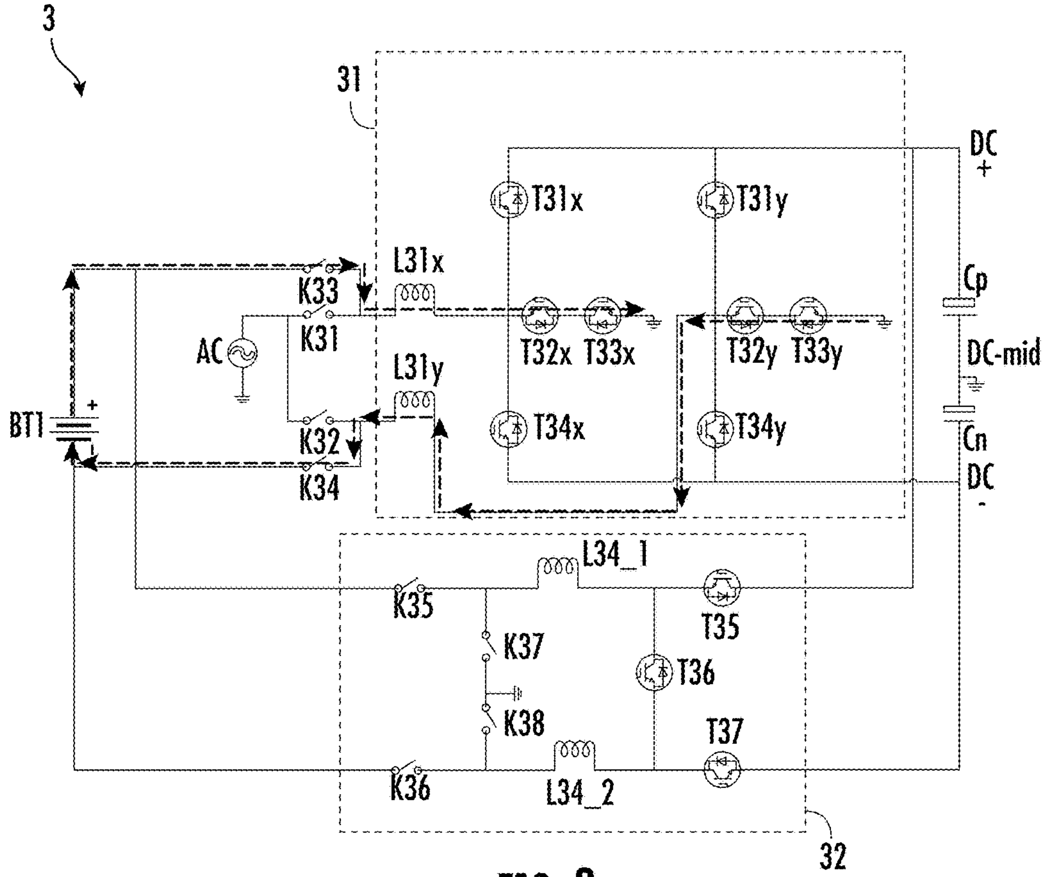
FIGS. 8 and 9 are schematic diagrams showing current directions in which a bridge arm unit of the power converter shown in FIG. 7 is multiplexed as a battery-mounted bridge arm in a battery mode.
Figure 9:
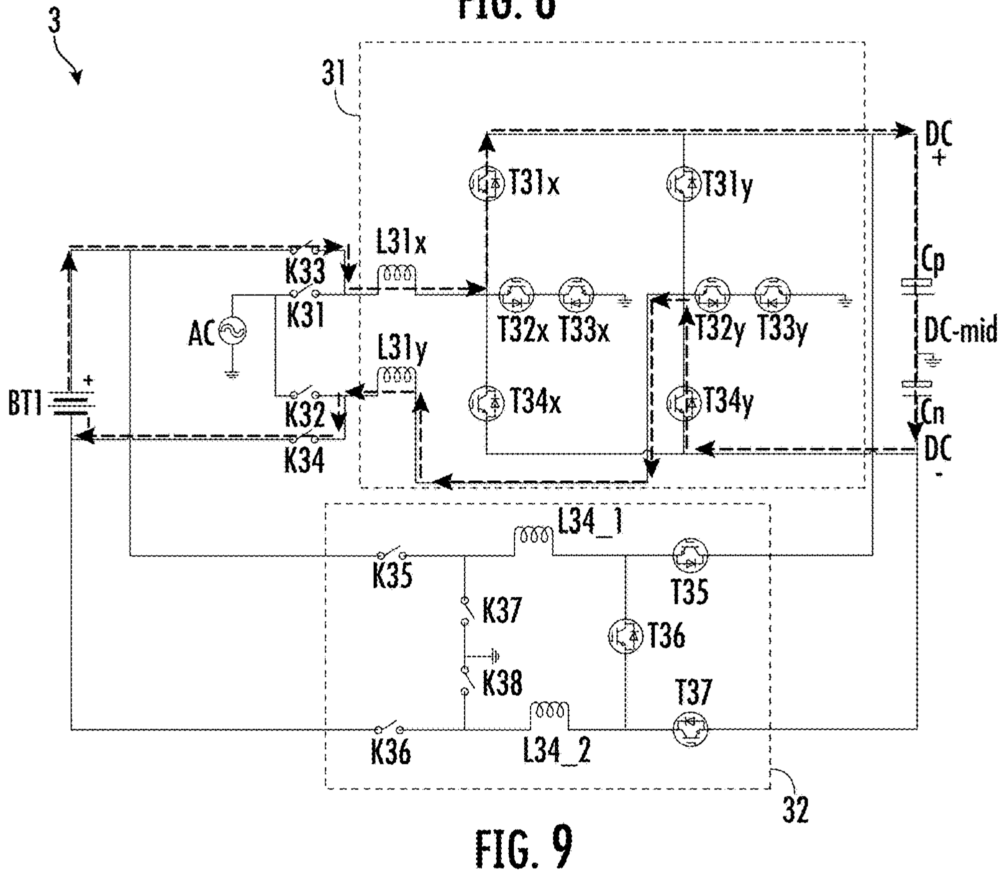

FIGS. 8 and 9 are schematic diagrams showing current directions in which the bridge arm unit 31 of the power converter 3 shown in FIG. 7 is multiplexed as a battery-mounted bridge arm in the battery mode. In the battery mode, the upper bridge arm of the bridge arm unit 31 is multiplexed as a mounted bridge arm from the positive electrode of the rechargeable battery BT1 to the positive DC bus DC+, and the lower bridge arm of the bridge arm unit 31 is multiplexed as a mounted bridge arm from the negative electrode of the rechargeable battery BT1 to the negative DC bus DC−. Specifically, the AC switches K31 and K32 are turned off, the DC switches K33 and K34 are turned on, the control module controls the switch transistors T33*x* and T32*y* to perform pulse width modulation, and the switch transistors T31*x*, T32*x*, and T34*x* of the upper bridge arm and the switch transistors T31*y*, T33*y*, and T34*y* of the lower bridge arm remain cut-off. Specifically, as shown in FIG. 8, when the switch transistors T33*x* and T32*y* are turned on, it is an energy storage process of the inductors L31*x* and L31*y*, having a current path of: positive electrode of the rechargeable battery BT1→inductor L31*x*→body diode of the switch transistor T32*x*→switch transistor T33*x*→neutral point→body diode of the switch transistor T33*y*→switch transistor T32*y*→inductor L31*y*→negative electrode of the rechargeable battery BT1→positive electrode of the rechargeable battery BT1. As shown in FIG. 9, when the switch transistors T33*x* and T32*y* are cut off, it is a release process of energy stored in the inductors L31*x* and L31*y*, having a current direction of: positive electrode of the rechargeable battery BT1→inductor L31*x*→diode body of the switch transistor T31*x*→positive DC bus DC+→negative DC bus DC−→diode body of the switch transistor T34*y*→inductor L31*y*→negative electrode of the rechargeable battery BT1→positive electrode of the rechargeable battery BT1.

The bidirectional DC-DC conversion unit 32 in the battery mode may be multiplexed as a positive and negative bus voltage balancing bridge arm. It is similar to the process in Embodiment 1 in which the bidirectional DC-DC conversion unit 12 is multiplexed as the positive and negative bus voltage balancing bridge arm, and will not be described again.

Figure 10:
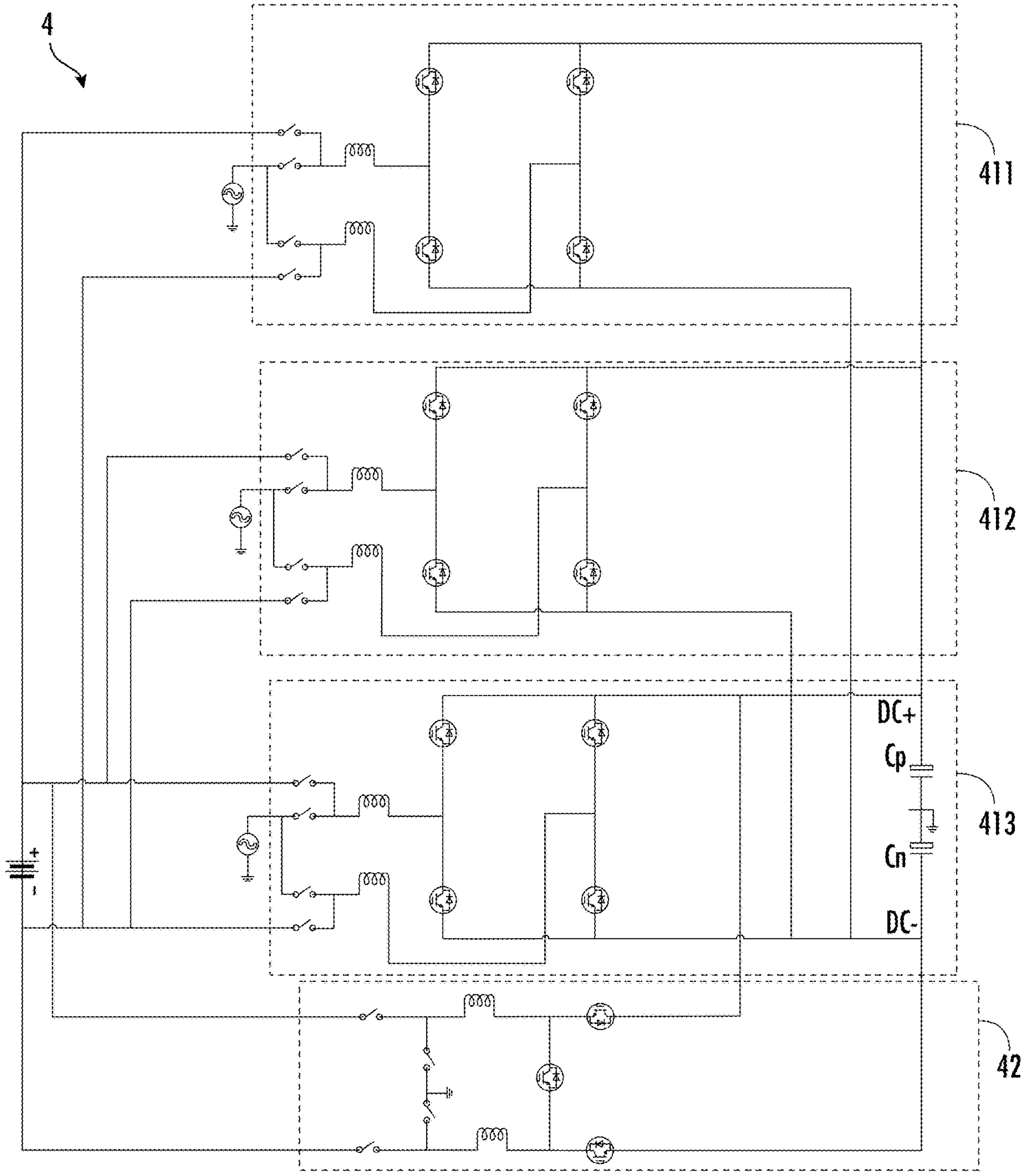
FIG. 10 is a circuit schematic diagram showing a three-phase two-level multiple input converter according to a fourth embodiment of the present invention.

FIG. 10 is a circuit schematic diagram showing a three-phase two-level multiple input converter according to a fourth embodiment of the present invention. The multiple input converter 4 shown in FIG. 10 has a first bridge arm unit 411, a second bridge arm unit 412, a third bridge arm unit 413, and a bidirectional DC-DC conversion unit 42. As shown in FIG. 10, the structure of each of the first, second, and third bridge arm units 411, 412, and 413 is the same as that of the bridge arm unit 11 shown in FIG. 1, and each bridge arm unit is configured to be able to receive power from one corresponding phase of the three-phase mains. The structure of the bidirectional DC-DC conversion unit 42 is the same as that of the bidirectional DC-DC conversion unit 12 shown in FIG. 1. The operating modes of the multiple input converter 4 shown in FIG. 10 include a general mains mode, a mains light load mode, a mains heavy load mode, and a battery mode (and a bus voltage balancing operation therein). The above operating modes are all similar to those of the multiple input converter 1 shown in FIG. 1, the only difference being between the three-phase mains and the single-phase mains, and will not be described again. Here, only a mains ramp-up mode that is the difference between the multiple input converter 4 and the single-phase multiple input converter 1 will be described.

Mains Ramp-Up Mode

When the three-phase mains is abnormal, after the multiple input converter 4 is controlled by the control module to disconnect from the three-phase mains and supply power of the rechargeable battery to the positive and negative DC buses independently by means of the first bridge arm unit 411, the second bridge arm unit 412, and the third bridge arm unit 413, and optionally by means of the bidirectional DC-DC conversion unit 42, if the detection module detects that the three-phase mains is restored to normal, the control module controls the first bridge arm unit 411, the second bridge arm unit 412, and the third bridge arm unit 413 to switch, in sequence at predetermined time intervals, from a mode in which the rechargeable battery performs DC-DC conversion and supplies power to the positive and negative DC buses (the battery mode) to a mode in which the mains of the corresponding phase is AC-DC converted and supplies power to the positive and negative DC buses (the mains mode). Thus, in the process in which the three bridge arm units output the power of the mains to the DC buses, the output power value gradually increases instead of rapidly increasing to a maximum value in a short period of time, which provides protection for circuit elements and improves the waveform of a current. The AC-DC conversion in each bridge arm unit is performed by the upper and lower bridge arms of the bridge arm unit in a staggered parallel mode. Before the first bridge arm unit 411, the second bridge arm unit 412, and the third bridge arm unit 413 enter the mains ramp-up mode, if the bidirectional DC-DC conversion unit 42 is performing the positive and negative bus voltage balancing process in the battery mode, then the bidirectional DC-DC conversion unit 42 is controlled by the control module to first switch to an external discharge mode, that is, it continues to supply the power of the rechargeable battery to the positive and negative DC buses through DC-DC conversion to stabilize the voltages of two ends of the positive and negative DC buses.

Figure 11:
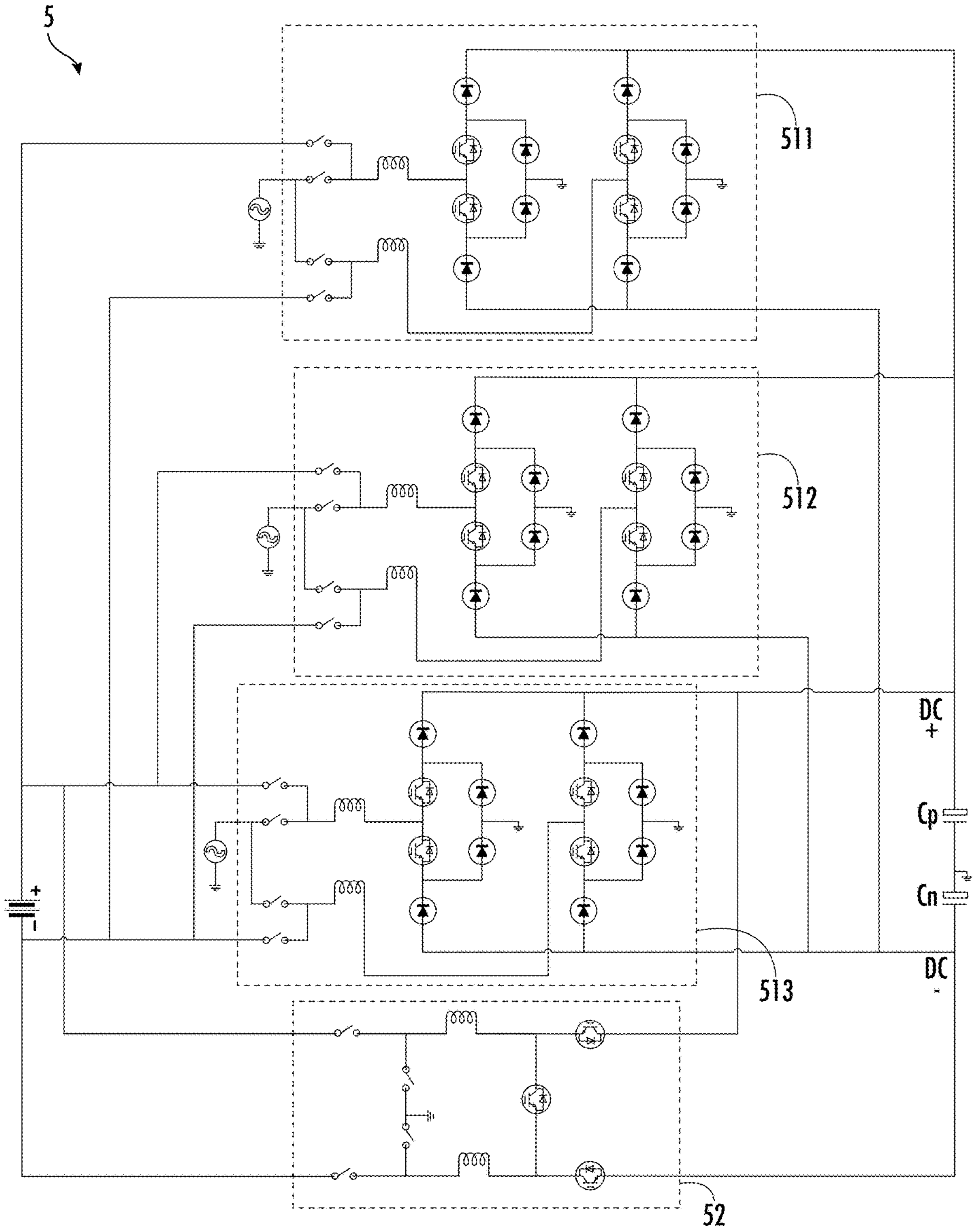
FIG. 11 is a circuit schematic diagram showing a three-phase I-type three-level multiple input converter according to a fifth embodiment of the present invention.

FIG. 11 is a circuit schematic diagram showing a three-phase I-type three-level multiple input converter according to a fifth embodiment of the present invention. The multiple input converter 5 shown in FIG. 11 has a first bridge arm unit 511, a second bridge arm unit 512, a third bridge arm unit 513, and a bidirectional DC-DC conversion unit 52. As shown in FIG. 11, the structure of each of the first, second, and third bridge arm units 511, 512, and 513 is the same as that of the bridge arm unit 21 shown in FIG. 4, and each bridge arm unit is configured to be able to receive power from one corresponding phase of the three-phase mains. The structure of the bidirectional DC-DC conversion unit 52 is the same as that of the bidirectional DC-DC conversion unit 22 shown in FIG. 4. The operating modes of the multiple input converter 5 shown in FIG. 11 include a general mains mode, a mains light load mode, a mains heavy load mode, and a battery mode (and a bus voltage balancing operation therein). The above operating modes are all similar to those of the multiple input converter 2 shown in FIG. 2, the only difference being between the three-phase mains and the single-phase mains. The multiple input converter 5 further includes a mains ramp-up mode, which is the same as the mains ramp-up mode of the multiple input converter 4 shown in FIG. 10, and will not be described again here.

Figure 12:
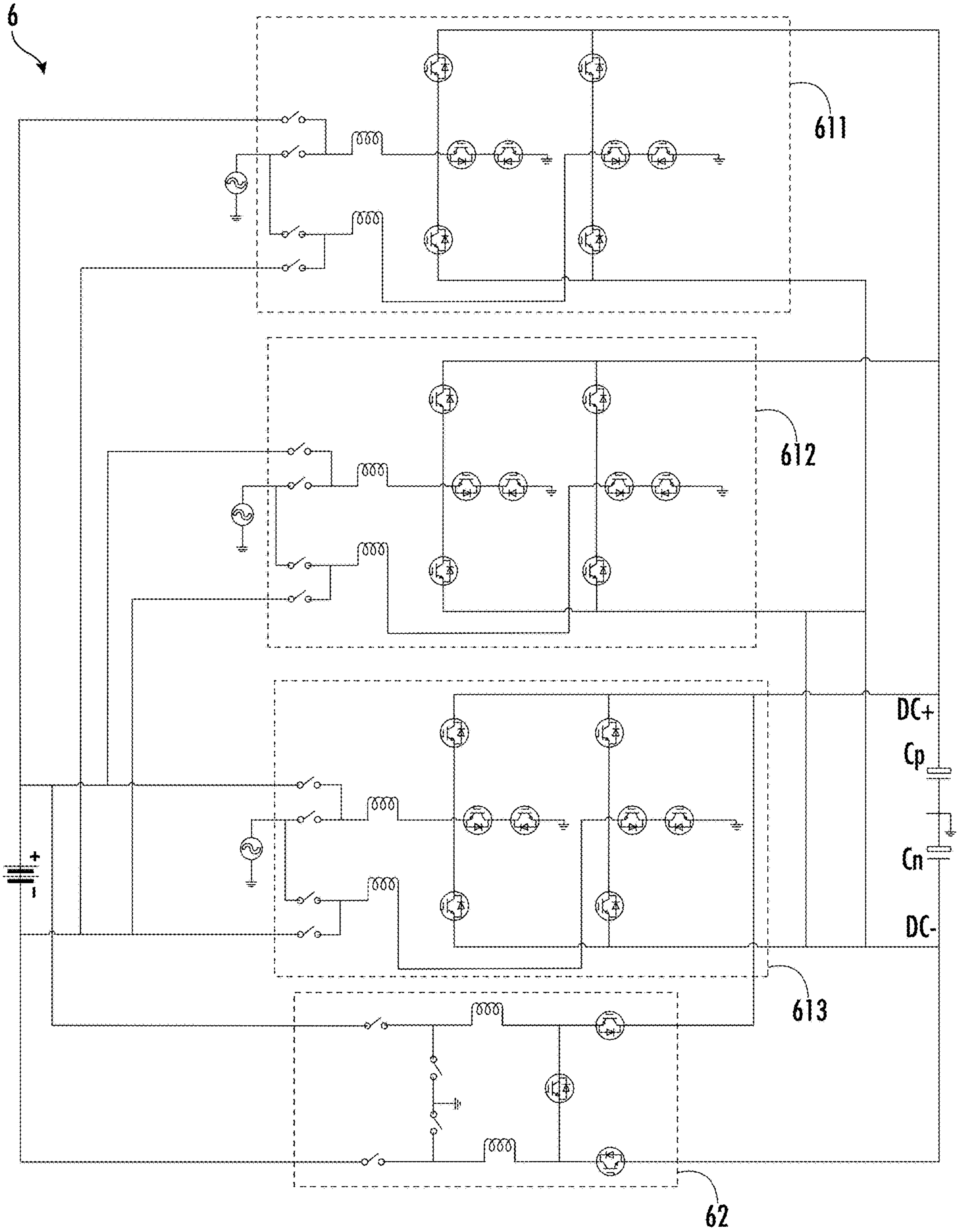
FIG. 12 is a circuit schematic diagram showing a three-phase T-type three-level multiple input converter according to a sixth embodiment of the present invention.

FIG. 12 is a circuit schematic diagram showing a three-phase T-type three-level multiple input converter according to a sixth embodiment of the present invention. The multiple input converter 6 shown in FIG. 12 has a first bridge arm unit 611, a second bridge arm unit 612, a third bridge arm unit 613, and a bidirectional DC-DC conversion unit 62. As shown in FIG. 12, the structure of each of the first, second, and third bridge arm units 611, 612, and 613 is the same as that of the bridge arm unit 31 shown in FIG. 7, and each bridge arm unit is configured to be able to receive power from one corresponding phase of the three-phase mains. The structure of the bidirectional DC-DC conversion unit 62 is the same as that of the bidirectional DC-DC conversion unit 32 shown in FIG. 7. The operating modes of the multiple input converter 6 shown in FIG. 12 include a general mains mode, a mains light load mode, a mains heavy load mode, and a battery mode (and a bus voltage balancing operation therein). The above operating modes are all similar to those of the multiple input converter 2 shown in FIG. 7, the only difference being between the three-phase mains and the single-phase mains. The multiple input converter 5 further includes a mains ramp-up mode, which is the same as the mains ramp-up mode of the multiple input converter 4 shown in FIG. 10, and will not be described again here.

In other embodiments according to the present invention, on the basis of the embodiments shown in FIGS. 10 to 12, when the multiple input converter is controlled to output the voltage on the rechargeable battery to the positive and negative DC buses in the battery mode, the control unit can further be configured to cause the three-phase bridge arm units to output out of phase, so that the voltage waveforms outputted to the positive and negative DC buses are smoother and have less ripples. For example, preferably, when three bridge arm units are provided and correspond to three phases of an AC power input, the three bridge arm units are configured to perform pulse width modulation of a carrier wave and output, at 120° out of phase with each other, voltages to the positive and negative DC buses. When two bridge arm units are provided, and correspond to two phases of an AC power input, respectively, the two bridge arm units are configured to perform pulse width modulation of a carrier wave and output, at 180° out of phase with each other, voltages to the positive and negative DC buses.

In other embodiments according to the present invention, on the basis of the embodiments shown in FIGS. 10 to 12, the multiple input converter may be further configured with more than three N bridge arm units, such as five, seven, or the like, thus being able to correspond to more phases of AC power.

In other embodiments according to the present invention, one of the switches K17 and K18 in the bidirectional DC-DC conversion unit as shown in FIG. 1 may be omitted.

In various embodiments according to the present invention, at least one of the switch transistors is configured as an insulated-gate bipolar transistor (IGBT) having an anti-parallel diode, an emitter, and a collector, but in other embodiments, at least one of the switch transistors can also be replaced with a metal oxide semiconductor field-effect transistor (MOSFET) having an anti-parallel diode, a source, and a drain.

This application provides a power converter, comprising a bridge arm unit and a bidirectional DC-DC conversion unit, the bridge arm unit comprising an upper b ridge arm and a lower bridge arm, an AC switch group, and a first DC switch group, the bidirectional DC-DC conversion unit comprising a second DC switch group, wherein input ends of the bridge arm unit are selectably connected to an AC power by means of the AC switch group or to a rechargeable battery by means of the first DC switch group, an end of the bidirectional DC-DC conversion unit is connected to the rechargeable battery by means of the second DC switch group, and another end of the bidirectional DC-DC conversion unit and output ends of the bridge arm unit are connected in parallel to positive and negative DC buses, wherein the power converter is configured such that in a battery mode, the AC switch group is turned off and the first DC switch group is turned on, the input ends of the bridge arm unit are connected to the rechargeable battery, and the bridge arm unit converts and outputs a voltage across positive and negative electrodes of the rechargeable battery to the positive and negative DC buses; when the second DC switch group is controlled to electrically connect the bidirectional DC-DC conversion unit to the rechargeable battery, the rechargeable battery discharges power via the bidirectional DC-DC conversion unit; and when the second DC switch group is controlled to electrically isolate the bidirectional DC-DC conversion unit from the rechargeable battery, the bidirectional DC-DC conversion unit performs a bus voltage balancing process.

Preferably, wherein the bus voltage balancing process alternately places the positive and negative DC buses in communication with the neutral point to balance voltages of the positive and negative DC buses.

Preferably, in a mains mode, the AC switch group is turned on, the first DC switch group is turned off, the input ends of the bridge arm unit are connected to the AC power, the bridge arm unit rectifies and outputs the AC power to the positive and negative DC buses; when the second DC switch group is controlled to electrically connect the bidirectional DC-DC conversion unit to the rechargeable battery, and the bidirectional DC-DC conversion unit performs a charging or discharging process to the rechargeable battery according to load conditions.

Preferably, wherein the AC switch group comprises a first AC switch and a second AC switch, the first DC switch group comprises a first DC switch and a second DC switch; an input end of the upper bridge arm and an input end of the lower bridge arm are respectively connected to the AC power by means of the first AC switch and the second AC switch, input ends of the upper bridge arm and the lower bridge arm are respectively connected to the positive and negative electrodes of the rechargeable battery by means of the first DC switch and the second DC switch, and output ends of the upper bridge arm and the lower bridge arm are connected in parallel to the positive and negative DC buses.

In one embodiment, as shown in FIGS. 1 to 3, each of the upper bridge arm and the lower bridge arm is a two-level converter, the two-level converter comprises a first inductor (L11X; L11Y), a first switch transistor (T11X; T11Y) and a second switch transistor (T12X; T12Y), wherein a first end of the first inductor (L11X; L11Y) is the input end of the upper bridge arm or the lower bridge arm, a second end of the first inductor (L11X; L11Y) is connected to a first end of the first switch transistor (T11X; T11Y), a first end of the second switch transistor (T12X; T12Y) and a second end of the first switch transistor (T11X; T11Y), and a second end of the second switch transistor (T12X; T12Y) are respectively connected to a positive DC bus and a negative DC bus.

In one embodiment, as shown in FIGS. 1 to 3, wherein in the battery mode, the bridge arm unit 11 is configured so that: the first switch transistor T11X of the upper bridge arm and the second switch transistor T12Y of the lower bridge arm remain cut-off; within a first period, the second switch transistor T12X of the upper bridge arm and the first switch transistor T11Y of the lower bridge arm are turned on so that the respective first inductor (L11X; L11Y) of the upper bridge arm and the lower bridge arm store energy, and within a second period, the second switch transistor T12X of the upper bridge arm and the first switch transistor T11Y of the lower bridge arm are cut off, so that the respective first inductor (L11X; L11Y) of the upper bridge arm and the lower bridge arm and the rechargeable battery jointly boost the voltage of the positive and negative DC buses and supply energy thereto.

In one embodiment, as shown in FIG. 7, wherein each of the upper bridge arm and the lower bridge arm is a T-type three-level converter, the T-type three-level converter comprises a first inductor (L31X; L31Y), a first switch transistor (T31*x*; T31*y*), a second switch transistor (T34*x*; T34*y*), a third switch transistor (T32*x*; T32*y*), and a fourth switch transistor (T33*x*; T33*y*), wherein a first end of the first inductor (L31X; L31Y) is the input end of the upper bridge arm or the lower bridge arm, a second end of the first inductor (L31X; L31Y) is connected to a first end of the first switch transistor (T31*x*; T31*y*), a first end of the second switch transistor (T34*x*; T34*y*) and a first end of the third switch transistor (T32*x*; T32*y*), a second end of the third switch transistor (T32*x*; T32*y*) is connected to a first end of the fourth switch transistor (T33*x*; T33*y*), a second end of the first switch transistor (T31*x*; T31*y*) and a second end of the second switch transistor (T34*x*; T34*y*) are respectively connected to the positive DC bus and the negative DC bus, and a second end of the fourth switch transistor (T33*x*; T33*y*) is grounded.

In one embodiment, as shown in FIG. 7, wherein in the battery mode, the bridge arm unit 31 is configured so that: the first switch transistor T31*x* of the upper bridge arm and the second switch transistor T34*y* of the lower bridge arm always remain cut-off; and within a first period, the fourth switch transistor T33*x* of the upper bridge arm and the third switch transistor T32*y* of the lower bridge arm are turned on so that the respective first inductor (L31X; L31Y) of the upper bridge arm and the lower bridge arms store energy, and within a second period, the fourth switch transistor T33*x* of the upper bridge arm and the third switch transistor T32*y* of the lower bridge arm are cut off, so that the respective first inductor L31X of the upper lower bridge arm and the lower bridge arm and the rechargeable battery jointly boost the voltage of the positive and negative DC buses and supply energy thereto.

In one embodiment, as shown in FIGS. 4 and 11, wherein each of the upper bridge arm and the lower bridge arm is an I-type three-level converter, the I-type three-level converter comprises a first inductor (L21X; L21Y), a first switch transistor (T22*x*; T22*y*), a second switch transistor (T23*x*; T23*y*), a first diode D21, a second diode D22, a third diode D23, and a fourth diode D24, wherein a first end of the first inductor (L21X; L21Y) is the input end of the upper bridge arm or the lower bridge arm, a second end of the first inductor (L21X; L21Y) is connected to a first end of the first switch transistor (T22*x*; T22*y*) and a first end of the second switch transistor (T23*x*; T23*y*), a second end of the first switch transistor (T22*x*; T22*y*) is connected to an anode of the first diode D21 and a cathode of the second diode D22, a second end of the second switch transistor (T23*x*; T23*y*) is connected to an anode of the third diode D23 and a cathode of the fourth diode, a cathode of the first diode D21 and an anode of the fourth diode are respectively connected to the positive DC bus and the negative DC bus, and an anode of the second diode D22 and a cathode of the third diode D23 are grounded.

In one embodiment, as shown in FIGS. 4 and 11, wherein in the battery mode, the bridge arm unit is configured so that: the first switch transistor T22*x* of the upper bridge arm and the second switch transistor T23*y* of the lower bridge arm remain cut-off; within a first period, the second switch transistor T23*x* of the upper bridge arm and the first switch transistor T22*y* of the lower bridge arm are turned on so that the respective first inductor (L21X; L21Y) of the upper and lower bridge arms store energy, and within a second period, the second switch transistor T23*x* of the upper bridge arm and the first switch transistor T22y of the lower bridge arm are cut off, so that the respective first inductor (L21X; L21Y) of the upper and lower bridge arms and the rechargeable battery jointly boost the voltage of the positive and negative DC buses and supply energy thereto.

In one embodiment, as shown in FIGS. 1 to 3, wherein the bidirectional DC-DC conversion unit further comprises a second inductor L14-1, a third inductor L14-2, a fifth switch transistor T15, a sixth switch transistor T16, and a seventh switch transistor T17; the second DC switch group comprises a first grounding switch K17, a third DC switch K15 and a fourth DC switch K16.

Wherein a first end of the second inductor L14-1 is connected to a second end of the fifth switch transistor T15 and a first end of the sixth switch transistor T16, a first end of the fifth switch transistor T15 is connected to the positive DC bus, a first end of the third inductor L14-2 is connected to a first end of the seventh switch transistor T17 and a second end of the sixth switch transistor T16, a second end of the seventh switch transistor T17 is connected to the negative DC bus, a second end of the second inductor L14-1 is connected to a first end of the third DC switch K15 and a first end of the first grounding switch K17, a second end of the third DC switch K15 is connected to the positive electrode of the rechargeable battery, a second end of the third inductor L14-2 is connected to a first end of the fourth DC switch and a second end of the first grounding switch K17, and a second end of the fourth DC switch K16 is connected to the negative electrode of the rechargeable battery.

In one embodiment, as shown in FIGS. 1 to 3, wherein the second DC switch group further comprises a second grounding switch K18, a first end of the second grounding switch K18 and a second end of the first grounding switch K17 are grounded together, and a second end of the second grounding switch K18 is connected to a first end of the fourth DC switch K16 and a second end of the third inductor L14-2.

In one embodiment, as shown in FIGS. 1 to 3, wherein in the battery mode, the bus voltage balancing process comprises: the first grounding switch K17 and the second grounding switch K18 are turned on, the third DC switch K15 and the fourth DC switch K16 are turned off, the fifth switch transistor T15 and the seventh switch transistor T17 are alternately turned on, and the sixth switch transistor T16 remains turned on.

Preferably, wherein the converter is configured so that: when load power exceeds a heavy load threshold, the bidirectional DC-DC conversion unit converts a voltage of the rechargeable battery and supply power to the positive and negative DC buses; and/or when the load power is lower than a light load threshold, one of the upper bridge arm and the lower bridge arm performs voltage conversion and supplies power to the positive and negative DC buses.

Preferably, the converter comprises at least one bridge arm unit, each bridge arm unit corresponds to one phase of the AC power, the each bridge arm unit corresponds to one AC switch group and one first DC switch group, the input ends of the each bridge arm unit are selectably connected to the AC power by means of the corresponding AC switch group or to the rechargeable battery by means of the corresponding first DC switch group, and the output ends of the each bridge arm unit are connected in parallel to the positive and negative DC buses.

Preferably, when three bridge arm units are provided and the AC power is three-phase AC power, pulse width modulation of carrier waves of the three bridge arm units are out of phase with each other at 120°; or when two bridge arm units are provided and the AC power is two-phase AC power, pulse width modulation of carrier waves of the two bridge arm units are out of phase with each other at 180°.

Preferably, N bridge arm units are provided, and when the mains is restored from a fault, the converter is configured to switch the bidirectional DC-DC conversion unit firstly from the bus voltage balancing process to discharging the rechargeable battery, and then the N bridge arm units switch from the battery mode to the mains mode in sequence at predetermined time intervals.

This application further provides an online uninterruptible power supply, comprising the converter according to the embodiments above.

Although the present invention has been described through preferred embodiments, the present invention is not limited to the embodiments described herein, but includes various changes and variations made without departing from the scope of the present invention.

What is claimed is:

1. A power converter comprising:

a bridge arm unit and a bidirectional direct current (DC)-DC conversion unit, the bridge arm unit comprising an upper bridge arm and a lower bridge arm, an AC switch group, and a first DC switch group, wherein the bidirectional DC-DC conversion unit comprises a second DC switch group, wherein input ends of the bridge arm unit are selectably connected to an alternating current (AC) power by means of the AC switch group or to a rechargeable battery by means of the first DC switch group, an end of the bidirectional DC-DC conversion unit is connected to the rechargeable battery by means of the second DC switch group, and another end of the bidirectional DC-DC conversion unit and output ends of the bridge arm unit are connected in parallel to positive and negative DC buses;

wherein the power converter is configured such that in a battery mode, the AC switch group is turned off and the first DC switch group is turned on, the input ends of the bridge arm unit are connected to the rechargeable battery, and the bridge arm unit converts and outputs a voltage across positive and negative electrodes of the rechargeable battery to the positive and negative DC buses;

wherein when the second DC switch group is controlled to electrically connect the bidirectional DC-DC conversion unit to the rechargeable battery, the rechargeable battery discharges power via the bidirectional DC-DC conversion unit; and wherein when the second DC switch group is controlled to electrically isolate the bidirectional DC-DC conversion unit from the rechargeable battery, the bidirectional DC-DC conversion unit performs a bus voltage balancing process.

2. The power converter of claim 1, wherein the bus voltage balancing process alternately places the positive and negative DC buses in communication with the neutral point to balance voltages of the positive and negative DC buses.

3. The power converter of claim 1, wherein in a mains mode, the AC switch group is turned on, the first DC switch group is turned off, the input ends of the bridge arm unit are connected to the AC power, the bridge arm unit rectifies and outputs the AC power to the positive and negative DC buses; when the second DC switch group is controlled to electrically connect the bidirectional DC-DC conversion unit to the rechargeable battery, and the bidirectional DC-DC conversion unit performs a charging or discharging process to the rechargeable battery according to load conditions.

4. The power converter of claim 1, wherein the AC switch group comprises a first AC switch and a second AC switch, the first DC switch group comprises a first DC switch and a second DC switch; an input end of the upper bridge arm and an input end of the lower bridge arm are respectively connected to the AC power by means of the first AC switch and the second AC switch, input ends of the upper bridge arm and the lower bridge arm are respectively connected to the positive and negative electrodes of the rechargeable battery by means of the first DC switch and the second DC switch, and output ends of the upper bridge arm and the lower bridge arm are connected in parallel to the positive and negative DC buses.

5. The power converter of claim 4, wherein each of the upper bridge arm and the lower bridge arm is a two-level converter, wherein the two-level converter comprises a first inductor, a first switch transistor and a second switch transistor, wherein a first end of the first inductor is the input end of the upper bridge arm or the lower bridge arm, a second end of the first inductor is connected to a first end of the first switch transistor, a first end of the second switch transistor and a second end of the first switch transistor, and a second end of the second switch transistor are respectively connected to a positive DC bus and a negative DC bus.

6. The power converter of claim 5, wherein in the battery mode, the bridge arm unit is configured so that:

the first switch transistor of the upper bridge arm and the second switch transistor of the lower bridge arm remain cut-off;

within a first period, the second switch transistor of the upper bridge arm and the first switch transistor of the lower bridge arm are turned on so that the respective first inductors of the upper bridge arm and the lower bridge arm store energy, and within a second period, the second switch transistor of the upper bridge arm and the first switch transistor of the lower bridge arm are cut off, so that the respective first inductors of the upper bridge arm and the lower bridge arm and the rechargeable battery jointly boost the voltage of the positive and negative DC buses and supply energy thereto.

7. The power converter of claim 4, wherein each of the upper bridge arm and the lower bridge arm is a T-type three-level converter, the T-type three-level converter comprises a first inductor, a first switch transistor, a second switch transistor, a third switch transistor, and a fourth switch transistor, wherein a first end of the first inductor is the input end of the upper bridge arm or the lower bridge arm, a second end of the first inductor is connected to a first end of the first switch transistor, a first end of the second switch transistor and a first end of the third switch transistor, a second end of the third switch transistor is connected to a first end of the fourth switch transistor, a second end of the first switch transistor and a second end of the second switch transistor are respectively connected to the positive DC bus and the and the negative DC bus, and a second end of the fourth switch transistor is grounded.

8. The power converter of claim 7, wherein in the battery mode, the bridge arm unit is configured so that:

the first switch transistor of the upper bridge arm and the second switch transistor of the lower bridge arm always remain cut-off; and within a first period, the fourth switch transistor of the upper bridge arm and the third switch transistor of the lower bridge arm are turned on so that the respective first inductors of the upper bridge arm and the lower bridge arms store energy, and within a second period, the fourth switch transistor of the upper bridge arm and the third switch transistor of the lower bridge arm are cut off, so that the respective first inductors of the upper lower bridge arm and the lower bridge arm and the rechargeable battery jointly boost the voltage of the positive and negative DC buses and supply energy thereto.

9. The power converter of claim 4, wherein each of the upper bridge arm and the lower bridge arm is an I-type three-level converter, the I-type three-level converter comprises a first inductor, a first switch transistor, a second switch transistor, a first diode, a second diode, a third diode, and a fourth diode, wherein a first end of the first inductor is the input end of the upper bridge arm or the lower bridge arm, a second end of the first inductor is connected to a first end of the first switch transistor and a first end of the second switch transistor, a second end of the first switch transistor is connected to an anode of the first diode and a cathode of the second diode, a second end of the second switch transistor is connected to an anode of the third diode and a cathode of the fourth diode, a cathode of the first diode and an anode of the fourth diode are respectively connected to the positive DC bus and the negative DC bus, and an anode of the second diode and a cathode of the third diode are grounded.

10. The power converter of claim 9, wherein in the battery mode, the bridge arm unit is configured so that:

the first switch transistor of the upper bridge arm and the second switch transistor of the lower bridge arm remain cut-off;

within a first period, the second switch transistor of the upper bridge arm and the first switch transistor of the lower bridge arm are turned on so that the respective first inductors of the upper and lower bridge arms store energy, and within a second period, the second switch transistor of the upper bridge arm and the first switch transistor of the lower bridge arm are cut off, so that the respective first inductors of the upper and lower bridge arms and the rechargeable battery jointly boost the voltage of the positive and negative DC buses and supply energy thereto.

11. The power converter of claim 1, wherein the bidirectional DC-DC conversion unit further comprises a second inductor, a third inductor, a fifth switch transistor, a sixth switch transistor, and a seventh switch transistor; the second DC switch group comprises a first grounding switch, a third DC switch and a fourth DC switch, wherein a first end of the second inductor is connected to a second end of the fifth switch transistor and a first end of the sixth switch transistor, a first end of the fifth switch transistor is connected to the positive DC bus, a first end of the third inductor is connected to a first end of the seventh switch transistor and a second end of the sixth switch transistor, a second end of the seventh switch transistor is connected to the negative DC bus, a second end of the second inductor is connected to a first end of the third DC switch and a first end of the first grounding switch, a second end of the third DC switch is connected to the positive electrode of the rechargeable battery, a second end of the third inductor is connected to a first end of the fourth DC switch and a second end of the first grounding switch, and a second end of the fourth DC switch is connected to the negative electrode of the rechargeable battery.

12. The power converter of claim 11, wherein the second DC switch group further comprises a second grounding switch, a first end of the second grounding switch and a second end of the first grounding switch are grounded together, and a second end of the second grounding switch is connected to a first end of the fourth DC switch and a second end of the third inductor.

13. The power converter of claim 12, wherein in the battery mode, the bus voltage balancing process comprises:

the first grounding switch and the second grounding switch are turned on, the third DC switch and the fourth DC switch are turned off, the fifth switch transistor and the seventh switch transistor are alternately turned on, and the sixth switch transistor remains turned on.

14. The power converter of claim 4, wherein the converter is configured so that:

when load power exceeds a heavy load threshold, the bidirectional DC-DC conversion unit converts a voltage of the rechargeable battery and supply power to the positive and negative DC buses; and/or when the load power is lower than a light load threshold, one of the upper bridge arm and the lower bridge arm performs voltage conversion and supplies power to the positive and negative DC buses.

15. The power converter of claim 1, wherein the converter comprises at least one bridge arm unit, each bridge arm unit corresponds to one phase of the AC power, the each bridge arm unit corresponds to one AC switch group and one first DC switch group, the input ends of the each bridge arm unit are selectably connected to the AC power by means of the corresponding AC switch group or to the rechargeable battery by means of the corresponding first DC switch group, and the output ends of the each bridge arm unit are connected in parallel to the positive and negative DC buses.

16. The power converter of claim 15, wherein when three bridge arm units are provided and the AC power is three-phase AC power, pulse width modulation of carrier waves of the three bridge arm units are out of phase with each other at 120°; or when two bridge arm units are provided and the AC power is two-phase AC power, pulse width modulation of carrier waves of the two bridge arm units are out of phase with each other at 180°.

17. The power converter of claim 15, wherein N bridge arm units are provided, and when the mains is restored from a fault, the converter is configured to switch the bidirectional DC-DC conversion unit firstly from the bus voltage balancing process to discharging the rechargeable battery, and then the N bridge arm units switch from the battery mode to the mains mode in sequence at predetermined time intervals.

18. An online uninterruptible power supply, comprising the converter of claim 1.

* * * * *